(12) United States Patent
Harada et al.

(10) Patent No.: US 11,978,897 B2
(45) Date of Patent: May 7, 2024

(54) ACTIVE MATERIAL, ELECTRODE, SECONDARY BATTERY, BATTERY PACK, AND VEHICLE

(71) Applicant: KABUSHIKI KAISHA TOSHIBA, Tokyo (JP)

(72) Inventors: Yasuhiro Harada, Isehara (JP); Yorikazu Yoshida, Yokohama (JP); Kakuya Ueda, Yokohama (JP); Norio Takami, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 134 days.

(21) Appl. No.: 17/408,910

(22) Filed: Aug. 23, 2021

(65) Prior Publication Data

US 2022/0293926 A1 Sep. 15, 2022

(30) Foreign Application Priority Data

Mar. 15, 2021 (JP) ................................. 2021-041570

(51) Int. Cl.
*H01M 4/485* (2010.01)
*H01M 10/42* (2006.01)
*H01M 4/02* (2006.01)

(52) U.S. Cl.
CPC ......... *H01M 4/485* (2013.01); *H01M 10/425* (2013.01); *H01M 2004/021* (2013.01);
(Continued)

(58) Field of Classification Search
CPC ............... H01M 4/485; H01M 10/425; H01M 2004/021; H01M 2004/4028; H01M 2220/20
See application file for complete search history.

(56) References Cited

U.S. PATENT DOCUMENTS

| 10,862,118 B2 | 12/2020 | Harada et al. |
| 2015/0243979 A1 | 8/2015 | Nakahara et al. |

(Continued)

FOREIGN PATENT DOCUMENTS

| CN | 107845768 A | 3/2018 |
| CN | 110299536 A | 10/2019 |

(Continued)

OTHER PUBLICATIONS

European Office Action dated Dec. 2, 2022 in European Patent Application No. 21185252.0, 3 pages.
(Continued)

*Primary Examiner* — Nicholas P D'Aniello
*Assistant Examiner* — Albert Michael Hilton
(74) *Attorney, Agent, or Firm* — Oblon, McClelland, Maier & Neustadt, L.L.P.

(57) ABSTRACT

According to one embodiment, an active material is provided. The active material includes an $Nb_2TiO_7$ phase and at least one Nb-rich phase selected from the group consisting of an $Nb_{10}Ti_2O_{29}$ phase, an $Nb_{14}TiO_{37}$ phase, and an $Nb_{24}TiO_{64}$ phase. The active material includes potassium and phosphorus, and a total concentration of potassium and phosphorus in the active material is in the range of 0.01% by mass to 5.00% by mass. An average crystallite diameter is in the range of 80 nm to 150 nm. In a particle size distribution chart obtained by a laser diffraction scattering method, D10 is 0.3 μm or greater, and D90 is 10 μm or less. The active material satisfies a peak intensity ratio represented by the following Formula (1).

$$0 < I_B/I_A \leq 0.25 \qquad (1)$$

19 Claims, 8 Drawing Sheets

(52) U.S. Cl.
CPC .......................... *H01M 2004/027* (2013.01); *H01M 2004/028* (2013.01); *H01M 2220/20* (2013.01)

(56) References Cited

U.S. PATENT DOCUMENTS

| | | |
|---|---|---|
| 2016/0276662 A1 | 9/2016 | Ise et al. |
| 2019/0296327 A1* | 9/2019 | Ise .................. H01M 4/133 |
| 2019/0296343 A1 | 9/2019 | Harada et al. |

FOREIGN PATENT DOCUMENTS

| | | | |
|---|---|---|---|
| EP | 3379613 A1 * | 9/2018 | .......... H01M 10/052 |
| EP | 3 915 941 A1 | 12/2021 | |
| JP | 2017-134972 A | 8/2017 | |
| JP | 2019-169343 A | 10/2019 | |

OTHER PUBLICATIONS

Observations on EP4059891A1, Nov. 2022, 4 pages.
Gasperin, "Affinement de la structure de TiNb$^2$O$^7$ et répartition des cations", Journal of Solid State Chemistry 53, 1984, 9 pages (with English Translation).
Nakai et al., "Actual Powder X-Ray Analysis", X-Ray Analysis Research Meeting of Japan Society for Analytical Chemistry (Asakura Shoten ), Jul. 10, 2009 , 59 pages (with English Translation).

* cited by examiner

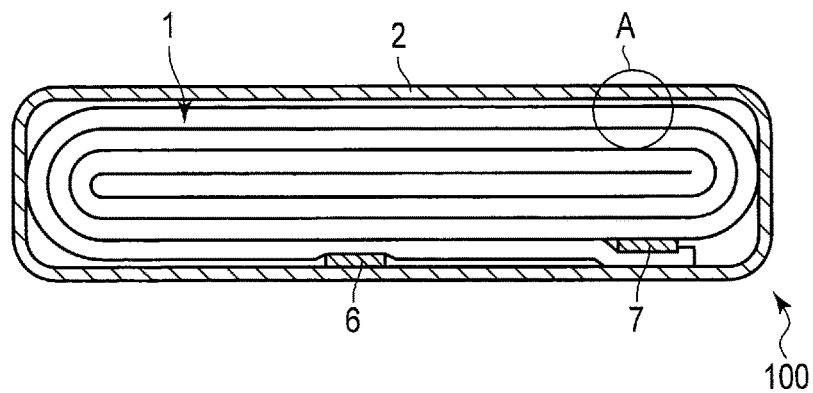
F I G. 4
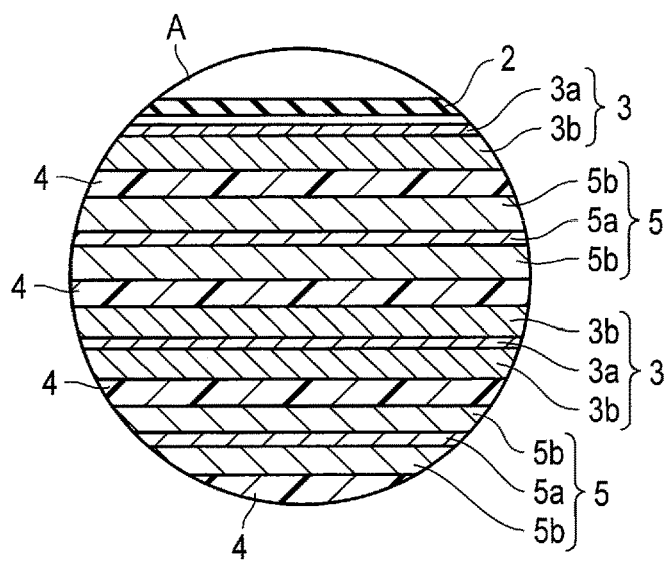
F I G. 5
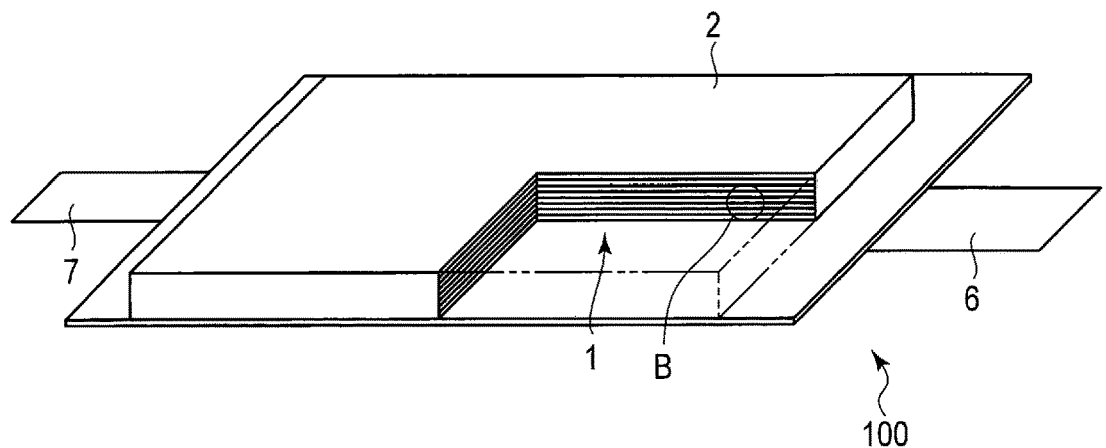
F I G. 6

ACTIVE MATERIAL, ELECTRODE, SECONDARY BATTERY, BATTERY PACK, AND VEHICLE

CROSS-REFERENCE TO RELATED APPLICATIONS

This application is based upon and claims the benefit of priority from Japanese Patent Application No. 2021-041570, filed Mar. 15, 2021, the entire contents of which are incorporated herein by reference.

FIELD

Embodiments described herein relate generally to an active material, an electrode, a secondary battery, battery pack, and a vehicle.

BACKGROUND

Recently, secondary batteries, such as a nonaqueous electrolyte secondary battery like a lithium ion secondary battery, have been actively researched and developed as a high energy-density battery. The secondary batteries, such as a nonaqueous electrolyte secondary battery, are anticipated as a power source for vehicles such as hybrid electric automobiles, electric cars, an uninterruptible power supply for base stations for portable telephones, or the like. Therefore, the secondary battery is demanded to, in addition to having a high energy density, be excellent in other performances such as rapid charge-discharge performances and long-term reliability, as well. For example, not only is the charging time remarkably shortened in a secondary battery capable of rapid charge and discharge, but the battery is also capable of improving motive performances in vehicles such as hybrid electric automobiles, and efficient recovery of regenerative energy of motive force.

In order to enable rapid charge/discharge, electrons and lithium ions must be able to migrate rapidly between the positive electrode and the negative electrode. However, when a battery using a carbon-based negative electrode is repeatedly subjected to rapid charge and discharge, precipitation of dendrite of metallic lithium on the electrode may sometimes occur, raising concern of heat generation or ignition due to internal short circuits.

In light of this, a battery using a metal composite oxide in a negative electrode in place of a carbonaceous material has been developed. In particular, in a battery using an oxide of titanium in the negative electrode, rapid charge and discharge can be stably performed. Such a battery also has a longer life than in the case of using a carbon-based negative electrode.

However, compared to carbonaceous materials, oxides of titanium have a higher potential relative to metallic lithium. That is, oxides of titanium are more noble. Furthermore, oxides of titanium have a lower capacity per weight. Therefore, a battery using an oxide of titanium for the negative electrode has a problem that the energy density is low.

For example, the electrode potential an oxide of titanium is about 1.5 V (vs. Li/Li$^+$) relative to metallic lithium, which is higher (i.e., more noble) in comparison to potentials of carbon based negative electrodes. The potential of an oxide of titanium is attributed to the redox reaction between Ti$^{3+}$ and Ti$^{4+}$ upon electrochemical insertion and extraction of lithium, and is therefore electrochemically restricted. It is also a fact that rapid charge/discharge of lithium ions can be performed stably at a high electrode potential of about 1.5 V (vs. Li/Li$^+$). Conventionally, it has therefore been difficult to drop the potential of the electrode in order to improve the energy density.

On the other hand, considering the capacity per unit weight, the theoretical capacity of titanium dioxide (anatase structure) is about 165 mAh/g, and the theoretical capacity of spinel type lithium-titanium composite oxides such as Li$_4$Ti$_5$O$_{12}$ is about 180 mAh/g. On the other hand, the theoretical capacity of a general graphite based electrode material is 385 mAh/g and greater. As such, the capacity density of an oxide of titanium is significantly lower than that of the carbon based negative electrode material. This is due to there being only a small number of lithium-insertion sites in the crystal structure, and lithium tending to be stabilized in the structure, and thus, substantial capacity being reduced.

In consideration of the above circumstances, a new electrode material containing Ti and Nb has been studied. Such a niobium-titanium composite oxide material is expected to have a high charge/discharge capacity. Particularly, a composite oxide represented by TiNb$_2$O$_7$ has a high theoretical capacity exceeding 380 mAh/g. Thus, a niobium-titanium composite oxide is expected as a high-capacity material to replace Li$_4$Ti$_5$O$_{12}$. However, it is difficult to significantly reduce the amounts of fine powder and coarse particles while maintaining high crystallinity. As such, challenges are faced with respect to input-output characteristics and cycle life characteristics.

BRIEF DESCRIPTION OF THE DRAWINGS

FIG. 4 is a cross-sectional view schematically illustrating an example of a secondary battery according to an embodiment;

FIG. 5 is an enlarged cross-sectional view of a section A of the secondary battery illustrated in FIG. 4;

FIG. 6 is a partially cut-out perspective view schematically illustrating another example of the secondary battery according to the embodiment;

DETAILED DESCRIPTION

Figure 1:
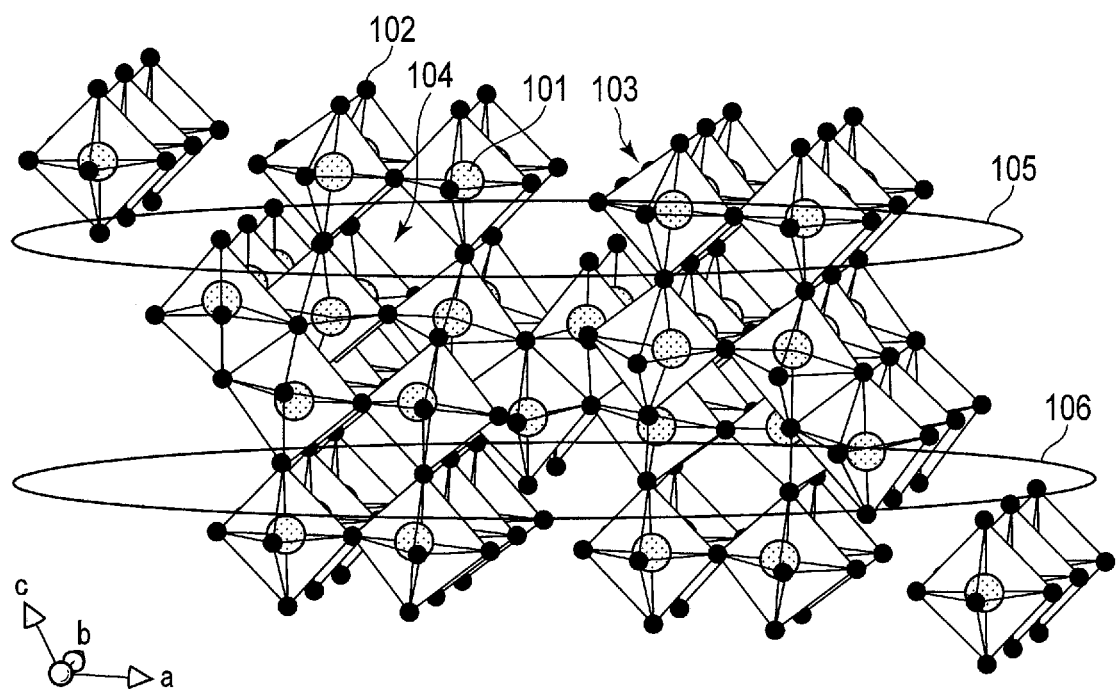
FIG. 1 is a schematic view illustrating a crystal structure of a niobium-titanium composite oxide Nb$_2$TiO$_7$.

According to a first embodiment, an active material is provided. The active material includes an Nb$_2$TiO$_7$ phase and at least one Nb-rich phase selected from the group consisting of an Nb$_{10}$Ti$_2$O$_{29}$ phase, an Nb$_{14}$TiO$_{37}$ phase, and an Nb$_{24}$TiO$_{64}$ phase. The active material includes potassium and phosphorus, and the total concentration of potassium and phosphorus in the active material is in the range of 0.01% by mass to 5.00% by mass. The average crystallite diameter is in the range of 80 nm to 150 nm. D10 is 0.3 µm or greater, and D90 is 10 µm or less, in a particle size distribution chart for the active material obtained by a laser diffraction scattering method. The active material satisfies a peak intensity ratio represented by the following Formula (1).

$$0 < I_B/I_A \leq 0.25 \quad (1)$$

In Formula (1), $I_A$ is a peak intensity of a maximum peak attributed to the $Nb_2TiO_7$ phase and appearing at 2θ of 26.0±0.1° in a wide-angle X-ray diffraction pattern under CuKα rays as an X-ray source; and $I_B$ is a peak intensity of a maximum peak attributed to the aforementioned at least one Nb-rich phase and appearing at 2θ of 24.9±0.2° in the diffraction pattern.

According to a second embodiment, an electrode is provided. The electrode includes the active material according to the first embodiment.

According to a third embodiment, a secondary battery is provided. The secondary battery includes a negative electrode, a positive electrode, and an electrolyte. The negative electrode is the electrode according to the second embodiment.

According to a fourth embodiment, a battery pack is provided. The battery pack includes the secondary battery according to the third embodiment.

According to a fifth embodiment, a vehicle is provided. The vehicle includes the battery pack according to the fourth embodiment.

Hereinafter, embodiments will be described with reference to the drawings. The same reference signs are applied to common components throughout the embodiments and overlapped explanations are thereby omitted. Each drawing is a schematic view for encouraging explanations of the embodiment and understanding thereof, and thus there are some details in which a shape, a size and a ratio are different from those in a device actually used, but they can be appropriately design-changed considering the following explanations and known technology.

Conventionally, when producing a niobium-titanium composite oxide by firing a raw material containing unavoidable impurities, coarse particles tend to be easily generated due to an impurity-caused decrease in the melting point. Coarse particles are grown particles having a large primary particle size. Coarse particles easily crack during charge and discharge; thus, an electron-conducting path between active material particles is less likely to be formed in an active material containing coarse particles, thus likely resulting in degradation of the rate characteristics and cycle life characteristics. Grown coarse particles have high crystallinity due to a decrease in the melting point, and thus have high Mohs hardness. Therefore, the crushing of powder containing the coarse particles thus generated in order to increase volume energy density, for example, leads to both a decrease in crystallinity and the generation of a large amount of fine powder. Since the fine powder thus generated has a large specific surface area, performance of charge and discharge leads to a side reaction with an electrolyte which contributes to the decrease in cycle life characteristics.

On the other hand, when the firing is performed at a temperature lower than usual, for example, in order to easily crush the generated coarse particles, the crystallinity of the particles decreases, and the amount of particles either unreacted or not fully reacted increases, thus also causing a decrease in rate characteristics, and the like. Namely, a niobium-titanium composite oxide powder having high crystallinity and a desired particle size distribution is difficult to obtain simply by lowering the firing temperature or crushing the powder after the firing.

First Embodiment

According to a first embodiment, an active material is provided. The active material includes an $Nb_2TiO_7$ phase and at least one Nb-rich phase selected from the group consisting of an $Nb_{10}Ti_2O_{29}$ phase, an $Nb_{14}TiO_{37}$ phase, and an $Nb_{24}TiO_{64}$ phase. The active material includes potassium and phosphorus, and the total concentration of potassium and phosphorus in the active material is in the range of 0.01% by mass to 5.00% by mass. The average crystallite diameter is in the range of 80 nm to 150 nm. D10 is 0.3 µm or greater, and D90 is 10 µm or less, in a particle size distribution chart for the active material obtained by a laser diffraction scattering method. The active material satisfies a peak intensity ratio represented by the following Formula (1).

$$0 < I_B/I_A \leq 0.25 \quad (1)$$

In Formula (1), $I_A$ is a peak intensity of a maximum peak attributed to the $Nb_2TiO_7$ phase and appearing at 2θ of 26.0±0.1° in a wide-angle X-ray diffraction pattern under CuKα rays as an X-ray source; and $I_B$ is a peak intensity of a maximum peak attributed to the aforementioned at least one Nb-rich phase and appearing at 2θ of 24.9±0.2° in the diffraction pattern.

A description will be given regarding a reason why the active material according to the first embodiment can exhibit excellent input-output characteristics and cycle life characteristics.

First, the $Nb_2TiO_7$ phase will be described. The main phase contained in the active material according to the embodiment is a niobium-titanium composite oxide phase represented by $Nb_2TiO_7$ as a representative composition. A composition of the niobium-titanium composite oxide preferably has a crystal structure having a symmetry of the space group C2/m and an atomic coordination described in Journal of Solid-State Chemistry 53, pp. 144-147 (1984) although not limited thereto.

The niobium-titanium composite oxide mainly has a monoclinic crystal structure. As an example, schematic views of the crystal structure of monoclinic $Nb_2TiO_7$ are illustrated in FIGS. 1 and 2.

Figure 2:
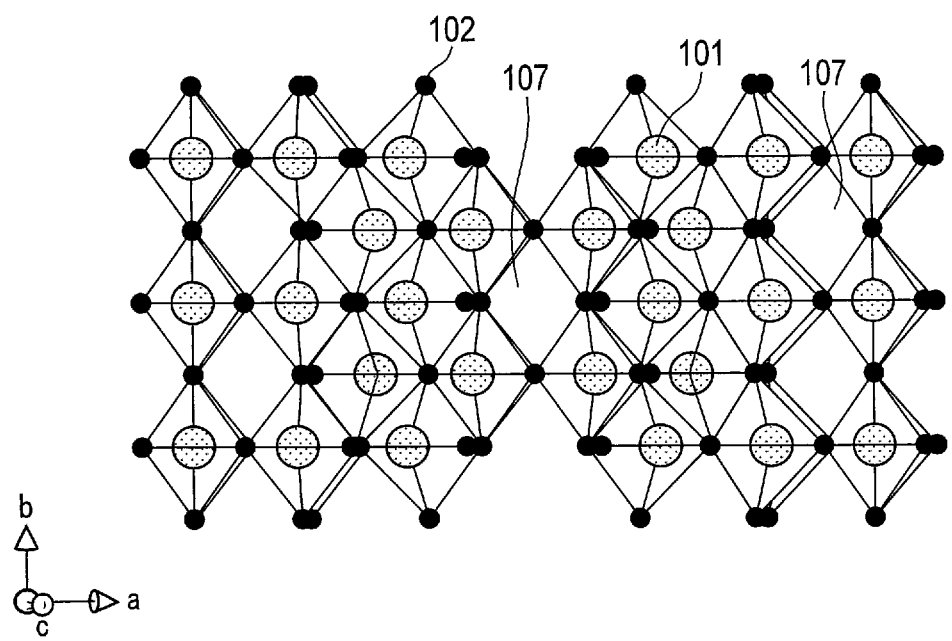
FIG. 2 is a schematic view of the crystal structure of FIG. 1 observed from another direction.

As illustrated in FIG. 1, in the crystal structure of monoclinic $Nb_2TiO_7$, a metal ion 101 and an oxide ion 102 form a skeleton structure section 103. At a position of the metal ion 101, Nb ions and Ti ions are arbitrarily arranged at a ratio of Nb:Ti=2:1. Such skeleton structures 103 are alternately arranged three-dimensionally, thereby vacancies 104 are formed among the skeleton structures 103. These vacancies 104 serve as hosts for lithium ions. Lithium ions can be inserted in this crystal structure from 0 moles up to a maximum of 5.0 moles. Therefore, the composition when 0 to 5.0 moles of lithium ions are inserted can be expressed as $Li_xNb_2TiO_7$ (0≤x≤5).

In FIG. 1, regions 105 and 106 are sections having two-dimensional channels in [100] and [010] directions. As illustrated in FIG. 2, the crystal structure of monoclinic $Nb_2TiO_7$ has a vacancy 107 along a [001] direction. This vacancy 107 has a tunnel structure advantageous in conduction of lithium ions and serves as an electrically conductive path in a [001] direction connecting region 105 and region

106. This electrically conductive path makes it possible for the lithium ions to migrate between regions 105 and 106. Further, the niobium-titanium composite oxide has a lithium insertion potential of about 1.5 V (vs. Li/Li$^+$). Therefore, an electrode including the niobium-titanium composite oxide as the active material can realize a battery that can stably repeat rapid charging and discharging.

When a lithium ion is inserted into the vacancy 104 in the above crystal structure, the metal ion 101, which forms the skeleton, is reduced to a trivalent, thereby maintaining electric neutrality of a crystal. In the niobium-titanium composite oxide, not only a Ti ion is reduced from tetravalent to trivalent, but also an Nb ion is reduced from pentavalent to trivalent. Therefore, the number of reduced valences per active material weight is large. Therefore, the niobium-titanium composite oxide can maintain electric neutrality of the crystal even if many lithium ions are inserted. Thus, energy density is higher in the niobium-titanium composite oxide as compared to that of a compound such as titanium oxide only containing a tetravalent cation. In addition, the $Nb_2TiO_7$ phase is superior to the $Nb_{10}Ti_2O_{29}$ phase, the $Nb_{14}TiO_{37}$ phase, and the $Nb_{24}TiO_{64}$ phase, which will be described later, in terms of the weight energy density. This is because the number of Nb atoms per mol contained in the $Nb_{10}Ti_2O_{29}$ phase, the $Nb_{14}TiO_{37}$ phase, and the $Nb_{24}TiO_{64}$ phase is large, that is, the weight per mol thereof is large.

Next, the $Nb_{10}Ti_2O_{29}$ phase, the $Nb_{14}TiO_{37}$ phase, and the $Nb_{24}TiO_{64}$ phase will be described. A basic skeleton structure thereof is similar to the crystal structure of the monoclinic $Nb_2TiO_7$ illustrated in FIGS. 1 and 2. When a lithium ion is inserted into the vacancy 104, the metal ion 101, which forms the skeleton, is reduced to a trivalent, thereby maintaining electric neutrality of a crystal. The composition when lithium ions are inserted into the $Nb_{10}Ti_2O_{29}$ phase can be expressed as $Li_xNb_{10}Ti_2O_{29}$ ($0 \leq x \leq 22$). The composition when lithium ions are inserted into the $Nb_{14}TiO_{37}$ phase can be expressed as $Li_xNb_{14}TiO_{37}$ ($0 \leq x \leq 29$). The composition when lithium ions are inserted into the $Nb_{24}TiO_{64}$ phase can be expressed as $Li_xNb_{24}TiO_{64}$ ($0 \leq x \leq 49$).

In the $Nb_{10}Ti_2O_{29}$ phase, $Nb_{14}TiO_{37}$ phase, and the $Nb_{24}TiO_{64}$ phase containing a lot of niobium, the amount of reduction of Nb ions from tetravalent to trivalent is larger than that of $Nb_2TiO_7$ phase. Therefore, the number of reduced valences per mol of the active material is large. Therefore, $Nb_{10}Ti_2O_{29}$ phase, $Nb_{14}TiO_{37}$ phase, and the $Nb_{24}TiO_{64}$ phase can maintain electric neutrality of the crystal even if many lithium ions are inserted. Therefore, at least one Nb-rich phase selected from the group consisting of the $Nb_{10}Ti_2O_{29}$ phase, the $Nb_{14}TiO_{37}$ phase, and the $Nb_{24}TiO_{64}$ phase can stably maintain the crystal structure even when lithium ions are excessively inserted as compared with the $Nb_2TiO_7$ phase. As a result, even when lithium ions are excessively inserted, active material particles can be stably charged and discharged in the Nb-rich phase. That is, the Nb-rich phase is excellent in over-charge resistance. Incidentally, the Nb-rich phase in the present specification means a niobium-titanium composite oxide phase having an Nb/Ti ratio larger than two. The active material according to the embodiment may be a niobium-titanium composite oxide including an $Nb_2TiO_7$ phase and an Nb-rich phase.

On the other hand, the number of reduced valences per active material weight of the Nb-rich phase is smaller than that of the $Nb_2TiO_7$ phase. That is, since the weight per mol is large in the Nb-rich phase, the weight energy density is inferior to that of the $Nb_2TiO_7$ phase.

If the active material contains not only the $Nb_2TiO_7$ phase but also at least one Nb-rich phase selected from the group consisting of the $Nb_{10}Ti_2O_{29}$ phase, the $Nb_{14}TiO_{37}$ phase, and the $Nb_{24}TiO_{64}$ phase, the potential of the Nb-rich phase preferentially drops when the secondary battery is turned into the over-charged state. Therefore, it is possible to suppress a potential rise of the positive electrode while ensuring a constant charging voltage during charging. As a result, the active material according to the embodiment can suppress generation of an oxidizing gas in the positive electrode and deterioration of the positive electrode, and thus, has excellent cycle life characteristics.

Also, the Nb-rich phase can alleviate a crystal lattice strain caused by Li extracted and inserted during charge and discharge. This is because the bond between oxide ions and Nb ions constituting the skeleton becomes strong. Thereby, deformation of the crystal lattice during charge and discharge of Li can be suppressed, leading to excellent cycle life characteristics.

To achieve the above advantages, it is effective for the active material to include a predetermined amount of Nb-rich phase. The predetermined amount herein refers to an amount that makes it possible to satisfy Formula 1 of the peak intensity ratio ($I_B/I_A$) described later. However, since the bond between oxide ions and Nb ions constituting the skeleton is strong in the active material including the Nb-rich phase, as described above, a large number of particles exhibiting a high degree of hardness are generated. As a result, the active material includes many particles having a large particle size and has large D90, leading to difficulty in achieving high input-output characteristics. Also, when D90 is reduced by crushing the hard particles, the crystallinity decreases and the cycle life characteristics decrease. As such, it is difficult to achieve both high input-output characteristics and high cycle life in the active material including the Nb-rich phase.

The active material according to the embodiment includes a potassium element (K) and a phosphorus element (P). At least one of potassium or phosphorus preferably exists at a particle interface between the active material particles. Both potassium and phosphorus exist as oxides, for example. Part of potassium and part of phosphorus may be incorporated into the crystal phase. Potassium has an effect of lowering the melting point of the active material, making it possible to obtain high crystallinity at a relatively low firing temperature. On the other hand, phosphorus, by existing on at least a part of the surfaces of the active material particles, has effects of suppressing particle growth and preventing the particles of the active material from necking each other to become coarse. With potassium and phosphorus coexisting in the active material, it is not only possible to decrease D90 and increase D10 but also possible to obtain high crystallinity in the active material including the Nb-rich phase. As a result, both high input-output characteristics and high cycle life can be achieved.

The total concentration of potassium and phosphorus in the active material is in the range of 0.01% by mass to 5.00% by mass. If this concentration is less than 0.01% by mass, the above effects cannot be obtained. If this concentration is more than 5.00% by mass, the battery capacity decreases because potassium occupies the site into which Li should be inserted, or the input-output characteristics decrease because an oxide containing phosphorus becomes a resistance component at the particle interface. The total concentration of potassium and phosphorus in the active material is preferably in the range of 0.020% by mass to 4.00% by mass, and more preferably in the range of 0.050% by mass to 2.50% by mass. The total concentration of potassium and phosphorus in the active material may be in the range of more than 0.200% by mass and 5.00% by mass or less.

The concentration of potassium (hereinafter, also referred to as "$C_K$") in the active material is, for example, in the range of 0.005% by mass to 5.00% by mass, preferably in the range of 0.01% by mass to 0.2% by mass. If the potassium concentration $C_K$ is too high, the battery capacity may decrease because potassium occupies the site into which Li should be inserted. Alternatively, the input-output characteristics may decrease because insertion and extraction of Li are not performed smoothly due to anomalous growth of the particles caused by the flux effect of potassium.

The concentration of phosphorus (hereinafter, also referred to as "$C_p$") in the active material is, for example, in the range of 0.001% by mass to 1.00% by mass, preferably in the range of 0.005% by mass to 0.05% by mass. If the phosphorus concentration $C_P$ is too high, the input-output characteristics may decrease because an oxide containing phosphorus becomes a resistance component at the particle interface.

The ratio ($C_K/C_P$) of the potassium concentration $C_K$ in the active material to the phosphorus concentration $C_P$ in the active material is, for example, in the range of 1.0 to 50.0, preferably in the range of 2.0 to 20.0. The ratio ($C_K/C_P$) may be in the range of 2.0 to 50.0 or in the range of 5.0 to 40.0. In the active material according to the embodiment, the potassium concentration is preferably higher than the phosphorus concentration. The reason for this is as follows: although phosphorus has a strong tendency to remain on the particle surface and functions to suppress necking or anomalous growth of particles, if the phosphorus concentration is higher than the potassium concentration, sufficient crystal growth is not promoted, and the movement of Li ions is prevented by the phosphorus remaining on the surface of the active material. As such, a decrease in input-output characteristics, etc., occur.

In the particle size distribution chart obtained by the laser diffraction scattering method for the active material according to the embodiment, the particle size of the 10% volume frequency (D10) is 0.3 µm or greater. High D10 means that the amount of fine powder is small. When D10 is 0.3 µm or greater, the side reaction with an electrolyte can be reduced because the amount of fine powder included in the active material is small. As a result, a secondary battery exhibiting excellent rate characteristics and cycle life characteristics can be realized. D10 is preferably in the range of 0.4 µm to 1.5 µm, and more preferably in the range of 0.5 µm to 1.0 µm. If D10 is greater than 1.5 µm, rapid charge-and-discharge performance tends to decrease.

Also, in the particle size distribution chart, the particle size of the 90% volume frequency (D90) is 10 µm or less. Low D90 means that the amount of coarse particles is small. When D90 is 10 µm or less, cracking of the coarse particles due to charge and discharge is less likely to occur as the amount of coarse particles included in the active material is small. In the absence of coarse particle cracking, a favorable electron-conducting path is easily maintained, and the side reaction attributed to an increase in specific surface area can also be reduced. Therefore, excellent rate characteristics and cycle life characteristics can be achieved. As an example, D90 is 5.0 µm or greater. D90 is preferably in the range of 6.0 µm to 9.0 µm.

Conventionally, it is necessary to lower the firing temperature or strongly crush the powder obtained after firing in order to render D90 10 µm or less. Thus, it is difficult to decrease D90 and increase D10 while maintaining high crystallinity. However, since the active material according to the embodiment includes potassium and phosphorus at a predetermined concentration, it is possible to suppress the act of particles necking each other while increasing the crystallinity in the annealing step performed when synthesizing the active material. This not only suppresses the particle growth during annealing to reduce the number of coarse particles, but also causes the particles to easily break even when only mild crushing is performed after annealing. Accordingly, it is possible to decrease D90 by cracking the coarse particles without decreasing the crystallinity of the active material. It is also possible to suppress generation of fine powder when only mild crushing is performed. Namely, it is possible to increase D10. Thus, even when the Nb-rich phase including active material particles having high hardness coexists, a favorable particle size distribution can be obtained without the performance of powerful crushing.

The average crystallite diameter of the active material is, for example, in the range of 80 nm to 150 nm, preferably in the range of 90 nm to 150 nm, and more preferably in the range of 95 nm to 120 nm. The average crystallite diameter being 80 nm or greater means that the crystal structure is formed firmly. Such a crystal structure is less likely to degrade even when rapid charge and discharge are repeated, and thus contributes to improvement of the secondary battery life performance. If the average crystallite diameter is larger than 150 nm, the diffusion distance of Li ions will be long. Thus, the mobility of Li ions during rapid charge and discharge may decrease.

Furthermore, the active material according to the embodiment satisfies the peak intensity ratio represented by the following Formula (1).

$$0 < I_B/I_A \leq 0.25 \quad (1)$$

In Formula (1), $I_A$ is a peak intensity of the maximum peak attributed to the $Nb_2TiO_7$ phase and appearing at 2θ of 26.0±0.1° in a wide angle X-ray diffraction pattern under CuKα rays as an X-ray source, and $I_B$ is a peak intensity of the maximum peak attributed to at least one Nb-rich phase selected from the group consisting of the $Nb_{10}Ti_2O_{29}$ phase, the $Nb_{14}TiO_{37}$ phase, and the $Nb_{24}TiO_{64}$ phase and appearing at 2θ of 24.9±0.2° in the above diffraction pattern. A method of performing the wide angle X-ray diffraction method and obtaining a diffraction pattern will be described later.

The peak intensity $I_A$ is the peak intensity (peak height) attributed to the $Nb_2TiO_7$ phase. This peak is a peak having the maximum peak intensity within a range where 2θ is 26.0±0.1°. A high peak intensity $I_A$ means that the weight of the $Nb_2TiO_7$ phase accounting for the active material is large.

The peak intensity $I_B$ is a peak intensity (peak height) attributed to at least one Nb-rich phase selected from the group consisting of the $Nb_{10}Ti_2O_{29}$ phase, the $Nb_{14}TiO_{37}$ phase, and the $Nb_{24}TiO_{64}$ phase. This peak is a peak having the maximum peak intensity within a range where 2θ is 24.9±0.2°. A high peak intensity $I_B$ means that the weight of the Nb-rich phase accounting for the active material is large.

As described above, when the active material includes the Nb-rich phase, the over-charge resistance is improved and the life characteristics of the secondary battery are improved. However, when the Nb-rich phase is infinitely increased, the over-charge resistance does not improve by the amount of such an increase. In addition, if the peak intensity ratio $I_B/I_A$ is excessively large, not only the weight energy density is lowered because the active material becomes heavy but also the electrode is distorted or active material particles crack due to a difference in a volume expansion rate at the time of charging and discharging between the $Nb_2TiO_7$ phase and at least one Nb-rich phase selected from the group consisting of the $Nb_{10}Ti_2O_{29}$ phase, the $Nb_{14}TiO_{37}$ phase, and the $Nb_{24}TiO_{64}$ phase, which is not preferable. Therefore, the peak intensity ratio ($I_B/I_A$) is 0.25 or less.

The peak intensity ratio $I_B/I_A$ is larger than 0. The overcharge resistance and the cycle life tend to decrease if the peak intensity ratio $I_B/I_A$ is excessively small because the weight of the Nb-rich phase is insufficient.

The peak intensity ratio $I_B/I_A$ is preferably 0.005 to 0.20, more preferably 0.01 to 0.15, and still more preferably 0.05 to 0.1.

The active material according to the embodiment may further include at least one additive element selected from the group consisting of Si, Fe, Ta, Na, Y, Al, and Sn. The amount of the additive element included in the active material is preferably 0.5 atm % or less relative to the Nb element in the active material. When the active material includes at least one selected from the group consisting of Fe, Ta, Y, Al, and Sn, the electron conductivity of the active material can be enhanced. When the active material includes at least one selected from the group consisting of Si and Na, it is possible to mitigate the decrease in capacity caused by the Nb-rich phase having a large weight.

The above-described additive element may be contained in the $Nb_2TiO_7$ phase or may be contained in at least one Nb-rich phase selected from the group consisting of $Nb_{10}Ti_2O_{29}$ phase, $Nb_{14}TiO_{37}$ phase, and the $Nb_{24}TiO_{64}$ phase. Alternatively, both the $Nb_2TiO_7$ phase, and the Nb-rich phase may contain the additive element. However, in either case, a content of the additive element is preferably 0.5 atm % or less relative to the Nb element in the active material.

The crystal structure of the active material particles can be observed by, for example, powder X-ray diffraction measurement and transmission electron microscope (TEM) observation, and the like. Details of these measurement methods will be described later.

Next, a form and a specific surface area of the active material according to the embodiment will be described.

<Form>

The form of the active material (niobium-titanium composite oxide) according to the embodiment is not particularly limited. For example, the active material may take the form of a primary particle including an $Nb_2TiO_7$ phase, an Nb-rich phase, potassium, and phosphorus. Alternatively, the active material may be mixed particles of primary particles each formed of a single $Nb_2TiO_7$ phase and primary particles each formed of a single Nb-rich phase, which of the mixed particles include potassium and phosphorus in at least part of these primary particles. The above respective primary particles may aggregate to form secondary particles. The particles of the niobium-titanium composite oxide may be a mixture of primary particles and secondary particles.

The particles of the niobium-titanium composite oxide may have a carbon-containing layer on its surface. The carbon-containing layer may be attached to the surface of the primary particle or may be attached to the surface of the secondary particle. Alternatively, the particles of the niobium-titanium composite oxide may contain secondary particles formed by aggregation of primary particles having a carbon-containing layer attached on its surface. Such secondary particles can exhibit excellent conductivity since carbon exists among the primary particles. The above-described mode containing the secondary particles is preferable since the active material-containing layer can exhibit a lower resistance.

<Specific Surface Area>

The specific surface area of the active material according to the embodiment is not particularly limited, but is preferably 0.5 m²/g to 5 m²/g. If the specific surface area is 0.5 m²/g or greater, a contact area with the electrolyte can be secured, favorable discharge rate characteristics can be easily obtained, and the charging time can be shortened. On the other hand, if the specific surface area is 5 m²/g or less, the reactivity with the electrolyte does not overly increase, and life characteristics can be improved. Further, the coating performance of a slurry containing the active material and used in the production of an electrode described later can be made favorable.

Here, for the measurement of the specific surface area, a method is used by which molecules, in which an occupied area in adsorption is known, are adsorbed onto the surface of powder particles at a temperature of liquid nitrogen and the specific surface area of the sample is determined from the amount of adsorbed molecules. The most commonly used is the BET method based on low-temperature and low-humidity physical adsorption of an inert gas, which is the most famous theory as a method of calculating the specific surface area by extending the Langmuir theory, which is monomolecular layer adsorption theory to multi-molecular layer adsorption. The specific surface area determined by the above method is referred to as a "BET (Brunauer, Emmett, Teller) specific surface area".

<Method of Producing Active Material>

The active material according to the embodiment can be produced by, for example, a synthesis method described below.

First, starting materials are mixed. As starting materials including niobium and titanium, oxides or salts including Nb and Ti are prepared. For example, $Nb_2O_5$ particles and $TiO_2$ particles can be used as starting materials. These starting materials are mixed so that a molar ratio ($M_{Nb}/M_{Ti}$) of niobium to titanium falls in the range of 2.0 to 4.0 according to the composition of the target Nb-rich phase. Herein, "$M_{Nb}$" represents a substance quantity (molar number) of niobium atoms included in the niobium-titanium composite oxide, and "$M_{Ti}$" represents a substance quantity (molar number) of titanium atoms included in the niobium-titanium composite oxide. Herein, the "molar ratio ($M_{Nb}/M_{Ti}$) of niobium to titanium" may be represented as a "Nb/Ti ratio".

After mixing the starting materials, the resultant mixture is ground to become as uniform as possible. Next, the mixture thus obtained is subjected to pre-firing (first firing). The pre-firing is performed two or more times in the temperature range of 500 to 900° C. for 10 to 40 hours in total. Thereby, precursor particles having high uniformity can be obtained.

Next, the precursor particles thus obtained are subjected to a main firing (second firing). The main firing is performed at a temperature of 800° C. to 1000° C. for 1 hour to 10 hours. At this point, the firing time may be determined so that a desired particle size distribution can be obtained. The crystallinity of the particles obtained by the main firing may be low. By performing firing at a relatively low temperature and multiple times through pre-firing and main firing in this manner, generation of coarse particles and fine particles can be suppressed.

Next, oxides or salts including potassium and phosphorus are prepared. The oxides or salts including potassium and phosphorus are added to the above particles obtained after the main firing, such that the content of potassium and phosphorus falls in the range of 0.010% by mass to 5.00% by mass, and wet mixing is performed. At this time, if the supply source including potassium and phosphorus is subjected to wet mixing using a raw material soluble in a solvent such as water, the supply source can be uniformly distributed on the surface of the fired particles, which is thus favorable.

Next, a mixture of the fired particles and potassium as well as phosphorus obtained by the wet mixing is subjected to annealing. The annealing is preferably performed at a temperature of 800° C. to 900° C. for 1 hour to 10 hours. Due to the flux effect of potassium and phosphorus, the crystallinity can be enhanced while suppressing the particle growth. A powder thus obtained is mildly crushed for as short a time period as possible and, as far as is possible, without applying a strong shear. For example, a roller compactor, a bead mill apparatus, or a ball mill apparatus, or the like can be used for the crushing. As a result, the crystallinity can be enhanced without causing large changes to the particle size distribution obtained by the main firing.

In addition, D10, D50, and D90 of an obtained active material can be controlled by changing the conditions for the crushing performed after the annealing. For example, D10, D50, and D90 can be decreased by increasing the crushing time. D10, D50, and D90 can also be decreased by using a medium having a smaller diameter as a crushing medium. Alternatively, it is possible to collect particles having small D10 or collect particles having large D90 by subjecting the powder to centrifugation. D10, D50, and D90 can be controlled by, for example, mixing the collected particles with a separately synthesized active material.

An active material powder having high crystallinity and having a small proportion of fine powder can be obtained by adding potassium and phosphorus to the particles subjected to the main firing so as to achieve a desired particle size distribution, then annealing the result, followed by mildly crushing the result, as described above, when producing a niobium-titanium composite oxide including an $Nb_2TiO_7$ phase and an Nb-rich phase. As a result, an active material can be obtained which exhibits excellent input-output characteristics while suppressing deformation of the crystal lattice during charge and discharge of Li and enhancing cycle life characteristics.

Lithium ions may be inserted into the niobium-titanium composite oxide synthesized by the above method by charging the battery post-assembly. Alternatively, a composite oxide including lithium may be synthesized by using a compound including lithium, such as lithium carbonate, as a starting material.

<Powder X-Ray Diffraction Measurement of Active Material and Calculation of Peak Intensity Ratio $I_B/I_A$>

The powder X-ray diffraction measurement of the active material can be performed, for example, as follows.

First, the target sample is ground until an average particle size reaches about 5 μm. A holder part, which has a depth of 0.2 mm and is formed on a glass sample plate, is filled with the ground sample. At this time, care should be taken to fill the holder part sufficiently with the sample. In addition, Precaution should be taken to perform the filling with the amount of the sample neither being excessive nor insufficient such that cracks, voids, and the like do not occur. Next, another glass plate is pushed from the outside to flatten a surface of the sample filling the holder part. Precaution should be taken not to cause a recess or a protrusion from a reference plane of the holder due to an excessive or insufficient amount of filling.

Next, the glass plate filled with the sample is set in a powder X-ray diffractometer, and a diffraction pattern (X-Ray diffraction pattern (XRD pattern)) is obtained using Cu-Kα rays.

Incidentally, there is a case where the orientation of the sample increases depending on a particle shape of the sample. In the case where there is high degree of orientation in the sample, there is the possibility of deviation of the peak or variation in an intensity ratio, depending on the filling state of the sample. The sample whose orientation is remarkably high in this manner is measured using a glass capillary. Specifically, a sample is inserted into a capillary, and this capillary is placed on a rotary sample stage and measured. It is possible to alleviate the orientation with the above-described measuring method. It is preferable to use a capillary formed of Lindeman glass having a diameter of 1 mm to 6 mmφ as the glass capillary.

When the powder X-ray diffraction measurement is performed on the active material contained in the electrode, the measurement is performed, for example, as follows.

First, a state in which lithium ions are completely extracted from the active material is achieved in order to comprehend the crystal structure of the active material. For example, when the active material is used in the negative electrode, the battery is turned into a completely-discharged state. For example, the discharged state of the battery can be achieved by repeating several times a discharging of the battery in a 25° C. environment at 0.1 C current to a rated end voltage, or repeating several times a discharging to a battery voltage of 1.0 V, making the current value during discharge be 1/100 or lower than the rated capacity. There is a case where a lithium ion remains even in the discharged state.

Next, the battery is disassembled in a glove box filled with argon, and the electrode is taken out and wash with an appropriate solvent. For example, ethyl methyl carbonate can be used as an appropriate solvent. If the washing of the electrode is insufficient, an impurity phase such as lithium carbonate and lithium fluoride may be mixed due to the influence of the lithium ion remaining in the electrode. In such a case, it is preferable to use an airtight container capable of performing measurement atmosphere in an inert gas. The washed electrode is cut so as to have the area approximately equal to the area of the holder of the powder X-ray diffractometer to obtain the measurement sample. The sample is directly attached to the glass holder to perform the measurement.

At this time, peaks derived from a metal foil serving as a current collector, a conductive agent, a binder, and the like are measured and grasped in advance using XRD. It is a matter of course that this operation can be omitted if such peaks can be grasped in advance. When the peak of the current collector and the peak of the active material overlap with each other, it is desirable to perform the measurement after peeling off the active material-containing layer from the current collector. This is in order to separate the overlapping peaks when quantitatively measuring the peak intensity. Although the active material-containing layer may be physically peeled off, peeling is easily performed when ultrasonic waves are applied in a solvent. When ultrasonic treatment is performed to peel off the active material-containing layer from the current collector, an electrode body powder (including the active material, the conductive agent, and the binder) can be collected by volatilizing the solvent.

The powder X-ray diffraction measurement of the active material can be performed by filling for example, a Lindemann glass capillary or the like with the collected electrode body powder and performing the measurement. The electrode body powder collected by the ultrasonic treatment can also be subjected to various analysis other than the powder X-ray diffraction measurement.

As an apparatus for powder X-ray diffraction measurement, SmartLab manufactured by Rigaku Corporation, for example, is used. The measurement conditions are as follows:

X-ray source: Cu target
Output: 45 kV 200 mA
Solar slit: 5° for both incident light and received light
Step width (2θ): 0.02 deg
Scan speed: 20 deg/min
Semiconductor detector: D/teX Ultra 250
Measurement range: 5°≤2θ≤90°
Sample plate holder: flat glass sample plate holder (thickness: 0.5 mm).

When any other apparatus is used, measurement is performed using standard Si powder for powder X-ray diffraction so that the equivalent measurement results as above can be obtained, and the conditions are adjusted so that the peak intensity and peak top position match those of the apparatus. Then, measurement is made.

In the obtained diffraction peaks, the peak intensity $I_A$ of the peak, attributed to the $Nb_2TiO_7$ phase having the maximum peak intensity within the range where 2θ is 26.0±0.1°, is determined. In addition, the peak intensity $I_B$ of the peak, attributed to at least one Nb-rich phase selected from the group consisting of the $Nb_{10}Ti_2O_{29}$ phase, the $Nb_{14}TiO_{37}$ phase, and the $Nb_{24}TiO_{64}$ phase having the maximum peak intensity within the range where 2θ is 24.9±0.2°, is determined. Then, the peak intensity ratio $I_B/I_A$ is calculated.

<Ascertainment of Crystallite Diameter>

The XRD diffraction pattern obtained by powder X-ray diffraction must be one that can be applied to a Rietveld analysis. In order to collect data for the Rietveld analysis, the step width is made to be ⅓ to ⅕ of the minimum half width of the diffraction peaks, and the measurement time and/or X-ray intensity are/is appropriately adjusted so that the intensity at the peak position of the strongest reflection will be a count of 5000 to 10000.

The obtained XRD pattern is analyzed by the Rietveld method. In the Rietveld method, the diffraction pattern is calculated from the crystal structure model estimated in advance. The parameters of the crystal structure (lattice constant, atomic coordination, occupancy ratio, etc.) can be analyzed precisely by fitting all the calculated values with the measured values. Thereby, the characteristics of the crystal structure of the synthesized oxide can be determined. The occupancy ratio of the constituent elements at each site can also be determined.

A fitting parameter S is used as the scale for estimating the degree of coincidence between the measured intensities and calculated intensities in the Rietveld analysis. An analysis needs to be performed so that the value of the parameter S will be less than 1.8. Also, when determining the occupancy ratio at each site, the standard deviation $\sigma_j$ must be taken into consideration. The fitting parameter S and the standard deviation $\sigma_j$ defined herein are estimated by the formula described in Non-Patent Literature 2 "Izumi Nakai and Fujio Izumi, ACTUAL POWDER X-RAY ANALYSIS", X-ray Analysis Research Meeting of Japan Society for Analytical Chemistry (Asakura Shoten), published on Jul. 10, 2009" (pages 97 to 115). In this method, the case where the fitting is performed by assuming the case where each cation uniformly occupies at each metal cation occupancy site of 2a or 4i in the crystal structure, and the case where the fitting is performed by setting an individual occupancy ratio for each element on the assumption that each cation is eccentrically-located, are tested for the monoclinic niobium-titanium composite oxide having a symmetry of the space group C2/m of the embodiment. As a result of this, it can be determined that a smaller convergence value of the fitting parameter S, that is, better fitting, indicates a state close to the actual occupancy state. Thereby, whether the respective cations are randomly arranged or not can be determined.

A diffraction line having the highest diffraction intensity is selected to obtain the crystallite diameter (crystallite size). For example, in a compound represented by $Li_xTi_{1-y}M1_yNb_{2-z}M2_zO_{7+\delta}$ as a niobium-titanium composite oxide, the peak of a (110) plane is measured. Herein, M1 is at least one selected from the group consisting of Zr, Si, and Sn. M2 is at least one selected from the group consisting of V, Ta, Bi, K, Ca, B, Co, Fe, Mn, Ni, Si, P, and Mo. The respective subscripts in the composition formula are specified as follows: 0≤x≤5, 0≤y<1, 0≤z<2, and −0.3≤δ≤0.3. The crystallite size can be calculated from the obtained half width of the peak. Herein, the crystallite size is calculated from the Scherrer equation shown in the following Formula (2).

[Formula 1]

$$\text{Crystallite Diameter (nm)} = \frac{K\lambda}{\beta\cos\theta} \quad \beta = \sqrt{\beta_e^2 - \beta_o^2} \qquad (2)$$

wherein K=0.9, λ=0.15406 nm, $\beta_e$: half width of the diffraction peak, $\beta_o$: correction value (0.07°) of the half width.

<High-Frequency Inductively Coupled Plasma Emission Spectrometric Analysis>

The concentrations of potassium and phosphorus in the active material can be analyzed according to the high-frequency inductively-coupled plasma (ICP) emission spectrometric analysis.

Part of the active material powder is put in a suitable solvent and irradiated with an ultrasonic wave. For example, an electrode body is put into ethyl methyl carbonate in a glass beaker which is then vibrated in an ultrasonic washing machine; thereby an active material-containing layer can be separated from a current collector. Next, the separated active material-containing layer is dried under reduced pressure. The obtained active material-containing layer is ground in a mortar or the like to provide a powder including an active material, a conductive agent, a binder, and the like. By dissolving the powder with an acid, a liquid sample including the active material can be prepared. On this occasion, hydrochloric acid, nitric acid, sulfuric acid, hydrogen fluoride, or the like can be used as the acid. The concentrations of potassium and phosphorus included in the active material can be analyzed by subjecting the liquid sample to the ICP emission spectrometric analysis.

<TEM Observation of Active Material>

According to the transmission electron microscope (TEM) observation, a distribution of each crystal phase can be confirmed. Also, whether or not potassium and phosphorus as additive elements are present at the particle interface can be confirmed. The energy dispersive X-ray spectroscopy (EDX) can also be performed, as necessary.

In the TEM observation, it is desirable to embed a target sample powder in a resin or the like and to sharpen the interior of a specimen by mechanical polishing, ion milling, or the like. Further, similar processing can be performed even if the target sample is the electrode body. For example, a desired portion can be observed by embedding the electrode body directly in a resin, or the current collector (metal foil) can be peeled from the electrode body to observe the electrode powder where the conductive material and the binder are mixed. In this manner, it is possible to know how the two crystal phases are distributed in the primary particle and to know a gradient of a composition in the particle.

Figure 3:
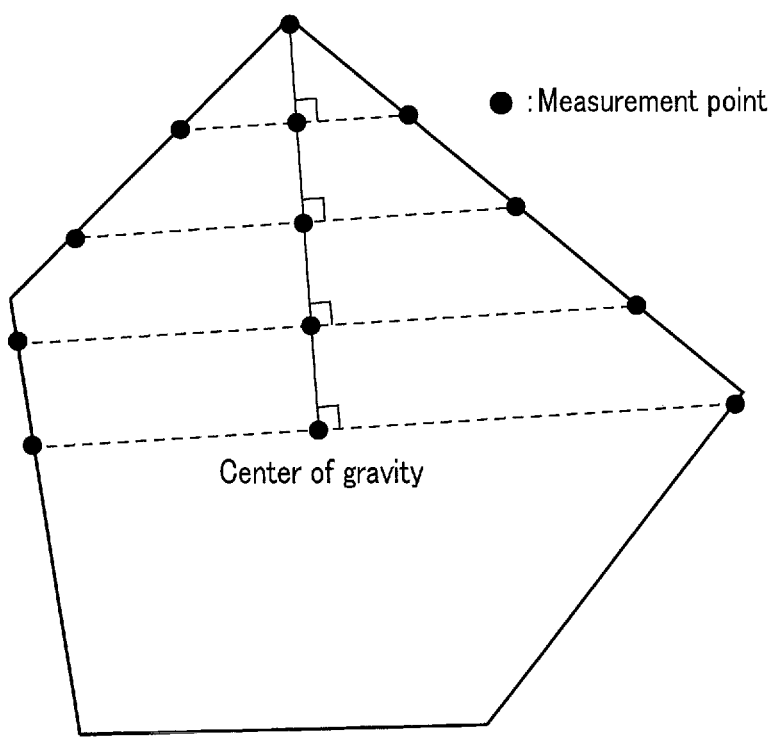
FIG. 3 is a plan view schematically illustrating particles to be measured in a transmission electron microscope (TEM) observation.

A specific example will be described hereinafter with reference to FIG. 3. FIG. 3 is a plan view schematically illustrating a particle to be measured. First, a gravity point of the particle to be measured is regarded as the center of the particle. Next, five measurement points are set at equal intervals on a straight line connecting the center of the particle and an arbitrary point on the particle surface. Multiwave interference images of particle parts at three points in a region orthogonal to each measurement point are investigated to observe an electron diffraction pattern. With this observation, it is possible to know a crystal structure included in the corresponding measurement point. For example, it is possible to easily distinguish the $Nb_2TiO_7$ phase, the $Nb_{10}Ti_2O_{29}$ phase, the $Nb_{14}TiO_{37}$ phase, and the $Nb_{24}TiO_{64}$ phase in addition to other phases by simulating an electron beam diffraction pattern in advance.

<Measurement of Particle Size Distribution of Active Material Particles by Laser Diffraction Scattering Method>

The powder of the electrode body described in the above section of the powder X-ray diffraction measurement is fired to render the conductive agent and the binder burned down. The remaining active material particles are dispersed in an N-methyl-2-pyrrolidone (NMP) solvent and subjected to an ultrasonic treatment, to obtain a dispersion solution as a sample for a particle size distribution measurement. A particle size distribution measurement of the constituent particles of the dispersion solution is performed using a laser diffraction distribution measurement apparatus. For example, Microtrac MT3100II manufactured by Microtrac-BEL Corp. can be used as the measurement apparatus.

The ultrasonic treatment for obtaining the above dispersion solution is performed by a sample supply system accompanying the laser diffraction distribution measurement apparatus. The ultrasonic treatment is performed, for example, at an output of 40 W for 300 seconds.

According to a first embodiment, an active material is provided. The active material includes an $Nb_2TiO_7$ phase and at least one Nb-rich phase selected from the group consisting of an $Nb_{10}Ti_2O_{29}$ phase, an $Nb_{14}TiO_{37}$ phase, and an $Nb_{24}TiO_{64}$ phase. The active material includes potassium and phosphorus, and the total concentration of potassium and phosphorus in the active material is in the range of 0.01% by mass to 5.00% by mass. The average crystallite diameter is in the range of 80 nm to 150 nm. D10 is 0.3 μm or greater, and D90 is 10 μm or less, in a particle size distribution chart for the active material obtained by a laser diffraction scattering method. The active material satisfies a peak intensity ratio represented by the following Formula (1).

$$0 < I_B/I_A \leq 0.25 \qquad (1)$$

In Formula (1), $I_A$ is a peak intensity of a maximum peak attributed to the $Nb_2TiO_7$ phase and appearing at 2θ of 26.0±0.1° in a wide-angle X-ray diffraction pattern under CuKα rays as an X-ray source; and $I_B$ is a peak intensity of a maximum peak attributed to the aforementioned at least one Nb-rich phase and appearing at 2θ of 24.9±0.2° in the diffraction pattern.

The active material according to the embodiment can realize a secondary battery capable of exhibiting excellent input-output characteristics and cycle life characteristics.

Second Embodiment

According to a second embodiment, an electrode is provided.

The electrode according to the second embodiment includes the active material according to the first embodiment. The electrode according to the embodiment may be a negative electrode or a positive electrode. The electrode according to the embodiment is, for example, an electrode for a battery, an electrode for a secondary battery, or an electrode for a lithium secondary battery. The electrode can be a negative electrode containing the active material according to the first embodiment as a negative electrode material.

The electrode according to the second embodiment may include a current collector and an active material-containing layer. The active material-containing layer may be formed on both of reverse surfaces or one surface of the current collector. The active material-containing layer may contain the active material, and optionally an electro-conductive agent and a binder.

The active material-containing layer may singly include the active material according to the first embodiment or include two or more kinds of the active material according to the first embodiment. Furthermore, a mixture where one kind or two or more kinds of the electrode material according to the first embodiment is further mixed with one kind or two or more kinds of another active material may also be included.

Other examples of the active material include lithium titanate having a ramsdellite structure (e.g., $Li_{2+y}Ti_3O_7$, 0≤y≤3), lithium titanate having a spinel structure (e.g., $Li_{4+x}Ti_5O_{12}$, 0≤x≤3), titanium dioxide ($TiO_2$), niobium pentoxide ($Nb_2O_5$), anatase-type titanium dioxide, rutile-type titanium dioxide, a hollandite-type titanium composite oxide, and an orthorhombic titanium-containing composite oxide. Other examples of the active material further include a niobium-titanium composite oxide different from the active material according to the first embodiment. The niobium-titanium composite oxide may have a monoclinic crystal structure.

Examples of the orthorhombic titanium-containing composite oxide include a compound represented by $Li_{2+a}M(I)_{2-b}Ti_{6-c}M(II)_dO_{14+\sigma}$. Here, M(I) is at least one selected from the group consisting of Sr, Ba, Ca, Mg, Na, Cs, Rb and K. M(II) is at least one selected from the group consisting of Zr, Sn, V, Nb, Ta, Mo, W, Y, Fe, Co, Cr, Mn, Ni and Al. The respective subscripts in the composition formula are specified as follows: 0≤a≤6, 0≤b≤2, 0≤c<6, 0≤d<6, and −0.5≤σ≤0.5. Specific examples of the orthorhombic titanium-containing composite oxide include $Li_{2+a}Na_2Ti_6O_{14}$ (0≤a≤6).

As an example of the above monoclinic niobium-titanium composite oxide, a compound represented by $Li_xTi_{1-y}M1_yNb_{2-z}M2_zO_{7+\delta}$ can be cited. Herein, M1 is at least one selected from the group consisting of Zr, Si, and Sn. M2 is at least one selected from the group consisting of V, Ta, and Bi. The respective subscripts in the composition formula are specified as follows: 0≤x≤5, 0≤y≤1, 0≤z<2, −0.3≤δ≤0.3. As a specific example of the monoclinic niobium-titanium composite oxide, $Li_xNb_2TiO_7$ (0≤x≤5) can be cited.

As another example of the monoclinic niobium-titanium composite oxide, a compound represented by $Ti_{1-y}$ $M3_{y+z}Nb_{2-z}O_{7-\delta}$ can be cited. Herein, M3 is at least one selected from Mg, Fe, Ni, Co, W, Ta, and Mo. The respective subscripts in the composition formula are specified as follows: $0 \leq y < 1$, $0 \leq z \leq 2$, and $-0.3 \leq \delta \leq 0.3$.

The electro-conductive agent is added to improve current collection performance and to suppress the contact resistance between the active material and the current collector. Examples of the electro-conductive agent include carbonaceous substances such as vapor grown carbon fiber (VGCF), carbon blacks such as acetylene black, and graphite. One of these may be used as the electro-conductive agent, or two or more may be used in combination as the electro-conductive agent. Alternatively, instead of using an electro-conductive agent, a carbon coating or an electro-conductive inorganic material coating may be applied to the surface of the active material particle.

The binder is added to fill gaps among the dispersed active material and also to bind the active material with the current collector. Examples of the binder include polytetrafluoroethylene (PTFE), polyvinylidene fluoride (PVdF), fluorine rubber, styrene-butadiene rubber, polyacrylate compounds, imide compounds, carboxymethyl cellulose (CMC), and salts of CMC. One of these may be used as the binder, or two or more may be used in combination as the binder.

The blending proportion of active material, electro-conductive agent and binder in the active material-containing layer may be appropriately changed according to the use of the electrode. For example, in the case of using the electrode as a negative electrode of a secondary battery, the active material, electro-conductive agent and binder in the active material-containing layer are preferably blended in proportions of 68% by mass to 96% by mass, 2% by mass to 30% by mass, and 2% by mass to 30% by mass, respectively. When the amount of electro-conductive agent is 2% by mass or more, the current collection performance of the active material-containing layer can be improved. When the amount of binder is 2% by mass or more, binding between the active material-containing layer and current collector is sufficient, and excellent cycling performances can be expected. On the other hand, an amount of each of the electro-conductive agent and binder is preferably 30% by mass or less, in view of increasing the capacity.

There may be used for the current collector, a material which is electrochemically stable at the potential (vs. Li/Li$^+$) at which lithium (Li) is inserted into and extracted from active material. For example in the case where the active material is used as a negative electrode material, the current collector is preferably made of copper, nickel, stainless steel, aluminum, or an aluminum alloy including one or more elements selected from the group consisting of Mg, Ti, Zn, Mn, Fe, Cu, and Si. The thickness of the current collector is preferably from 5 µm to 20 µm. The current collector having such a thickness can maintain balance between the strength and weight reduction of the electrode.

The current collector may include a portion where the active material-containing layer is not formed on a surface of the current collector. This portion may serve as an electrode tab.

The electrode may be produced by the following method, for example. First, active material according to the embodiment, electro-conductive agent, and binder are suspended in a solvent to prepare a slurry. The slurry is applied onto one surface or both of reverse surfaces of a current collector. Next, the applied slurry is dried to form a layered stack of active material-containing layer and current collector. Then, the layered stack is subjected to pressing. The electrode can be produced in this manner.

Alternatively, the electrode may also be produced by the following method. First, active material, electro-conductive agent, and binder are mixed to obtain a mixture. Next, the mixture is formed into pellets. Then the electrode can be obtained by arranging the pellets on the current collector.

The electrode according to the second embodiment includes the active material according to the first embodiment. Therefore, the electrode can realize a secondary battery capable of exhibiting excellent input-output characteristics and cycle life characteristics.

Third Embodiment

According to a third embodiment, there is provided a secondary battery including a negative electrode, a positive electrode, and an electrolyte. The secondary battery includes the electrode according to the second embodiment as the negative electrode. That is, the secondary battery according to the third embodiment includes, as the negative electrode, the electrode containing the active material according to the first embodiment.

The secondary battery according to the embodiment may further include a separator provided between the positive electrode and the negative electrode. The negative electrode, the positive electrode, and the separator can structure an electrode group. The electrolyte may be held in the electrode group.

The secondary battery may further include a container member that houses the electrode group and the electrolyte.

Further, the secondary battery may further include a negative electrode terminal electrically connected to the negative electrode and a positive electrode terminal electrically connected to the positive electrode.

The secondary battery may be, for example, a lithium ion secondary battery. The secondary battery also includes non-aqueous electrolyte secondary batteries containing nonaqueous electrolyte(s).

Hereinafter, the negative electrode, the positive electrode, the electrolyte, the separator, the container member, the negative electrode terminal, and the positive electrode terminal will be described in detail.

(1) Negative Electrode

The negative electrode may include a negative electrode current collector and a negative electrode active material-containing layer. The negative electrode current collector and the negative electrode active material-containing layer may be respectively a current collector and an active material-containing layer that may be included in the electrode according to the second embodiment. The negative electrode active material-containing layer contains the active material according to the first embodiment as a negative electrode active material.

Of the details of the negative electrode, parts overlapping with the details described in the second embodiment are omitted.

The density of the negative electrode active material-containing layer (excluding the current collector), that is, the electrode density is preferably from 1.8 g/cm³ to 3.5 g/cm³. The negative electrode, in which the density of the negative electrode active material-containing layer is within this range, is excellent in energy density and ability to hold the electrolyte. The density of the negative electrode active material-containing layer is more preferably from 2.5 g/cm³ to 2.9 g/cm³.

The negative electrode may be produced by a method similar to that for the electrode according to the second embodiment, for example.

(2) Positive Electrode

The positive electrode may include a positive electrode current collector and a positive electrode active material-containing layer. The positive electrode active material-containing layer may be formed on one surface or both of reverse surfaces of the positive electrode current collector. The positive electrode active material-containing layer may include a positive electrode active material, and optionally an electro-conductive agent and a binder.

As the positive electrode active material, for example, an oxide or a sulfide may be used. The positive electrode may singly include one kind of compound as the positive electrode active material, or include two or more kinds of compounds in combination. Examples of the oxide and sulfide include compounds capable of having Li and Li ions be inserted and extracted.

Examples of such compounds include manganese dioxides ($MnO_2$), iron oxides, copper oxides, nickel oxides, lithium manganese composite oxides (e.g., $Li_xMn_2O_4$ or $Li_xMnO_2$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese cobalt composite oxides (e.g., $Li_xMn_yCo_{1-y}O_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium phosphates having an olivine structure (e.g., $Li_xFePO_4$; $0<x\leq1$, $Li_xFe_{1-y}Mn_yPO_4$; $0<x\leq1$, $0<y<1$, and $Li_xCoPO_4$; $0<x\leq1$), iron sulfates [$Fe_2(SO_4)_3$], vanadium oxides (e.g., $V_2O_5$), and lithium nickel cobalt manganese composite oxides ($Li_xNi_{1-y-z}Co_yMn_zO_2$; $0<x\leq1$, $0<y<1$, $0<z<1$, $y+z<1$).

Among the above, examples of compounds more preferable as the positive electrode active material include lithium manganese composite oxides having a spinel structure (e.g., $Li_xMn_2O_4$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium manganese cobalt composite oxides (e.g., $Li_xMn_yCo_{1-y}O_2$; $0<x\leq1$, $0<y<1$), lithium iron phosphates (e.g., $Li_xFePO_4$; $0<x\leq1$), and lithium nickel cobalt manganese composite oxides ($Li_xNi_{1-y-z}Co_yMn_zO_2$; $0<x\leq1$, $0<y<1$, $0<z<1$, $y+z<1$). The positive electrode potential can be made high by using these positive electrode active materials.

When a room temperature molten salt is used as the electrolyte of the battery, it is preferable to use a positive electrode active material including lithium iron phosphate, $Li_xVPO_4F$ ($0\leq x\leq1$), lithium manganese composite oxide, lithium nickel composite oxide, lithium nickel cobalt composite oxide, or a mixture thereof. Since these compounds have low reactivity with room temperature molten salts, cycle life can be improved. Details regarding the room temperature molten salt are described later.

The primary particle size of the positive electrode active material is preferably from 100 nm to 1 µm. The positive electrode active material having a primary particle size of 100 nm or more is easy to handle during industrial production. In the positive electrode active material having a primary particle size of 1 µm or less, diffusion of lithium ions within solid can proceed smoothly.

The specific surface area of the positive electrode active material is preferably from 0.1 $m^2/g$ to 10 $m^2/g$. The positive electrode active material having a specific surface area of 0.1 $m^2/g$ or more can secure sufficient sites for inserting and extracting Li ions. The positive electrode active material having a specific surface area of 10 $m^2/g$ or less is easy to handle during industrial production, and can secure a good charge and discharge cycle performance.

The binder is added to fill gaps among the dispersed positive electrode active material and also to bind the positive electrode active material with the positive electrode current collector. Examples of the binder include polytetrafluoroethylene (PTFE), polyvinylidene fluoride (PVdF), fluorine rubber, polyacrylate compounds, imide compounds, carboxymethyl cellulose (CMC), and salts of CMC. One of these may be used as the binder, or two or more may be used in combination as the binder.

The electro-conductive agent is added to improve current collection performance and to suppress the contact resistance between the positive electrode active material and the positive electrode current collector. Examples of the electro-conductive agent include carbonaceous substances such as vapor grown carbon fiber (VGCF), carbon black such as acetylene black, and graphite. One of these may be used as the electro-conductive agent, or two or more may be used in combination as the electro-conductive agent. The electro-conductive agent may be omitted.

In the positive electrode active material-containing layer, the positive electrode active material and binder are preferably blended in proportions of 80% by mass to 98% by mass, and 2% by mass to 20% by mass, respectively.

When the amount of the binder is 2% by mass or more, sufficient electrode strength can be achieved. The binder may serve as an electrical insulator. Thus, when the amount of the binder is 20% by mass or less, the amount of insulator in the electrode is reduced, and thereby the internal resistance can be decreased.

When an electro-conductive agent is added, the positive electrode active material, binder, and electro-conductive agent are preferably blended in proportions of 77% by mass to 95% by mass, 2% by mass to 20% by mass, and 3% by mass to 15% by mass, respectively.

When the amount of the electro-conductive agent is 3% by mass or more, the above-described effects can be expressed. By setting the amount of the electro-conductive agent to 15% by mass or less, the proportion of electro-conductive agent that contacts the electrolyte can be made low. When this proportion is low, the decomposition of an electrolyte can be reduced during storage under high temperatures.

The positive electrode current collector is preferably an aluminum foil, or an aluminum alloy foil containing one or more elements selected from the group consisting of Mg, Ti, Zn, Ni, Cr, Mn, Fe, Cu, and Si.

The thickness of the aluminum foil or aluminum alloy foil is preferably from 5 µm to 20 µm, and more preferably 15 µm or less. The purity of the aluminum foil is preferably 99% by mass or more. The amount of transition metal such as iron, copper, nickel, or chromium contained in the aluminum foil or aluminum alloy foil is preferably 1% by mass or less.

The positive electrode current collector may include a portion where a positive electrode active material-containing layer is not formed on a surface of the positive electrode current collector. This portion may serve as a positive electrode tab.

The positive electrode may be produced by a method similar to that for the electrode according to the second embodiment, for example, using a positive electrode active material.

(3) Electrolyte

As the electrolyte, for example, a liquid nonaqueous electrolyte or gel nonaqueous electrolyte may be used. The liquid nonaqueous electrolyte is prepared by dissolving an electrolyte salt as solute in an organic solvent. The concentration of electrolyte salt is preferably from 0.5 mol/L to 2.5 mol/L.

Examples of the electrolyte salt include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), and lithium bistrifluoromethylsulfonylimide [$LiN(CF_3SO_2)_2$], and mixtures thereof. The electrolyte salt is preferably resistant to oxidation even at a high potential, and most preferably $LiPF_6$.

Examples of the organic solvent include cyclic carbonates such as propylene carbonate (PC), ethylene carbonate (EC), or vinylene carbonate (VC); linear carbonates such as diethyl carbonate (DEC), dimethyl carbonate (DMC), or methyl ethyl carbonate (MEC); cyclic ethers such as tetrahydrofuran (THF), 2-methyl tetrahydrofuran (2-MeTHF), or dioxolane (DOX); linear ethers such as dimethoxy ethane (DME) or diethoxy ethane (DEE); γ-butyrolactone (GBL), acetonitrile (AN), and sulfolane (SL). These organic solvents may be used singularly or as a mixed solvent.

The gel nonaqueous electrolyte is prepared by obtaining a composite of a liquid nonaqueous electrolyte and a polymeric material. Examples of the polymeric material include polyvinylidene fluoride (PVdF), polyacrylonitrile (PAN), polyethylene oxide (PEO), and mixtures thereof.

Alternatively, other than the liquid nonaqueous electrolyte and gel nonaqueous electrolyte, a room temperature molten salt (ionic melt) including lithium ions, a polymer solid electrolyte, an inorganic solid electrolyte, or the like may be used as the nonaqueous electrolyte.

The room temperature molten salt (ionic melt) indicates compounds among organic salts made of combinations of organic cations and anions, which are able to exist in a liquid state at room temperature (15° C. to 25° C.). The room temperature molten salt includes a room temperature molten salt which exists alone as a liquid, a room temperature molten salt which becomes a liquid upon mixing with an electrolyte salt, a room temperature molten salt which becomes a liquid when dissolved in an organic solvent, and mixtures thereof. In general, the melting point of the room temperature molten salt used in secondary batteries is 25° C. or below. The organic cations generally have a quaternary ammonium framework.

The polymer solid electrolyte is prepared by dissolving the electrolyte salt in a polymeric material, and solidifying it.

The inorganic solid electrolyte is a solid substance having Li ion conductivity.

The electrolyte may also be an aqueous electrolyte containing water.

The aqueous electrolyte includes an aqueous solvent and an electrolyte salt. The aqueous electrolyte is liquid, for example. A liquid aqueous electrolyte is an aqueous solution prepared by dissolving an electrolyte salt as the solute in an aqueous solvent. The aqueous solvent is a solvent containing 50% or more water by volume, for example. The aqueous solvent may also be pure water.

The aqueous electrolyte may also be an aqueous gel composite electrolyte containing an aqueous electrolytic solution and a polymer material. The polymer material may be, for example, polyvinylidene fluoride (PVDF), polyacrylonitrile (PAN), or polyethylene oxide (PEO).

The aqueous electrolyte preferably contains 1 mol or greater of aqueous solvent per 1 mol of the salt as the solute. In an even more preferably aspect, the aqueous electrolyte contains 3.5 mol or greater of aqueous solvent per 1 mol of the salt as the solute.

That the aqueous electrolyte contains water can be confirmed by gas chromatography—mass spectrometry (GC-MS) measurement. Also, the salt concentration and the amount of water contained in the aqueous electrolyte can be computed by measurement using inductively coupled plasma (ICP) emission spectroscopy or the like, for example. By measuring out a prescribed amount of the aqueous electrolyte and computing the contained salt concentration, the molar concentration (mol/L) can be computed. Also, by measuring the specific gravity of the aqueous electrolyte, the number of moles of the solute and the solvent can be computed.

The aqueous electrolyte is prepared by dissolving the electrolyte salt into the aqueous solvent at a concentration from 1 to 12 mol/L for example.

To suppress electrolysis of the aqueous electrolyte, LiOH, $Li_2SO_4$, or the like can be added to adjust the pH. The pH is preferably from 3 to 13, and more preferably from 4 to 12.

(4) Separator

The separator is formed of, for example, a porous film containing polyethylene (polyethylene; PE), polypropylene (polypropylene; PP), cellulose, or polyvinylidene fluoride (PVdF), or a synthetic resin nonwoven fabric. From the viewpoint of safety, it is preferable to use a porous film formed from polyethylene or polypropylene. This is because these porous films can be melted at a predetermined temperature to interrupt the current.

As a separator, a solid electrolyte layer containing solid electrolyte particles can also be used. The solid electrolyte layer may contain one kind of solid electrolyte particles, or may contain a plurality of kinds of solid electrolyte particles. The solid electrolyte layer may be a solid electrolyte composite film containing solid electrolyte particles. The solid electrolyte composite film is, for example, formed by molding solid electrolyte particles into a film shape using a polymer material. The solid electrolyte layer may contain at least one selected from the group consisting of plasticizers and electrolyte salts. When the solid electrolyte layer contains an electrolyte salt, for example, the alkali metal ion conductivity of the solid electrolyte layer can be further enhanced.

Examples of the polymer material include polyether-based, polyester-based, polyamine-based, polyethylene-based, silicone-based and polysulfide-based polymer materials.

As the solid electrolyte, it is preferable to use an inorganic solid electrolyte. Examples of the inorganic solid electrolyte include an oxide-based solid electrolyte and a sulfide-based solid electrolyte. As the oxide-based solid electrolyte, it is preferable to use a lithium phosphate solid electrolyte having a NASICON type structure and represented by the general formula $LiM_2(PO_4)_3$. M in the above general formula is preferably at least one kind of element selected from the group consisting of titanium (Ti), germanium (Ge), strontium (Sr), zirconium (Zr), tin (Sn), and aluminum (Al). It is more preferable that the element M contain any one element of Ge, Zr and Ti, and Al.

Specific examples of the lithium phosphate solid electrolyte having a NASICON type structure can include LATP ($Li_{1+x}Al_xTi_{2-x}(PO_4)_3$), $Li_{1+x}Al_xGe_{2-x}(PO_4)_3$, and $Li_{1+x}Al_xZr_{2-x}(PO_4)_3$. In the above formulae, x is in the range of $0<x\leq5$, preferably in the range of $0.1\leq x\leq0.5$. It is preferable to use LATP as the solid electrolyte. LATP has excellent water resistance and is less likely to cause hydrolysis in a secondary battery.

Further, as the oxide-based solid electrolyte, amorphous LIPON ($Li_{2.9}PO_{3.3}N_{0.46}$) or LLZ ($Li_7La_3Zr_2O_{12}$) having a garnet-type structure may be used.

(5) Container Member

As the container member, for example, a container made of laminate film or a container made of metal may be used.

The thickness of the laminate film is, for example, 0.5 mm or less, and preferably 0.2 mm or less.

As the laminate film, used is a multilayer film including multiple resin layers and a metal layer sandwiched between the resin layers. The resin layer may include, for example, a polymeric material such as polypropylene (PP), polyethylene (PE), nylon, or polyethylene terephthalate (PET). The metal layer is preferably made of aluminum foil or an aluminum alloy foil, so as to reduce weight. The laminate film may be formed into the shape of a container member, by heat-sealing.

The wall thickness of the metal container is, for example, 1 mm or less, more preferably 0.5 mm or less, and still more preferably 0.2 mm or less.

The metal case is made, for example, of aluminum or an aluminum alloy. The aluminum alloy preferably contains elements such as magnesium, zinc, or silicon. If the aluminum alloy contains a transition metal such as iron, copper, nickel, or chromium, the content thereof is preferably 100 ppm by mass or less.

The shape of the container member is not particularly limited. The shape of the container member may be, for example, flat (thin), square, cylinder, coin, or button-shaped. The container member may be appropriately selected depending on battery size and use of the battery.

(6) Negative Electrode Terminal

The negative electrode terminal may be made of a material that is electrochemically stable at the potential at which Li is inserted into and extracted from the above-described negative electrode active material, and has electrical conductivity. Specific examples of the material for the negative electrode terminal include copper, nickel, stainless steel, aluminum, and aluminum alloy containing at least one element selected from the group consisting of Mg, Ti, Zn, Mn, Fe, Cu, and Si. Aluminum or aluminum alloy is preferred as the material for the negative electrode terminal. The negative electrode terminal is preferably made of the same material as the negative electrode current collector, in order to reduce the contact resistance with the negative electrode current collector.

(7) Positive Electrode Terminal

The positive electrode terminal may be made of, for example, a material that is electrically stable in the potential range of 3 V to 5 V (vs. $Li/Li^+$) relative to the redox potential of lithium, and has electrical conductivity. Examples of the material for the positive electrode terminal include aluminum and an aluminum alloy containing one or more selected from the group consisting of Mg, Ti, Zn, Mn, Fe, Cu, and Si. The positive electrode terminal is preferably made of the same material as the positive electrode current collector, in order to reduce contact resistance with the positive electrode current collector.

Next, the secondary battery according to the third embodiment will be more specifically described with reference to the drawings.

FIG. 4 is a cross-sectional view schematically showing an example of a secondary battery according to the third embodiment. FIG. 5 is an enlarged cross-sectional view of section A of the secondary battery shown in FIG. 4.

The secondary battery 100 shown in FIGS. 4 and 5 includes a bag-shaped container member 2 shown in FIGS. 4 and 5, an electrode group 1 shown in FIG. 4, and an electrolyte, which is not shown. The electrode group 1 and the electrolyte are housed in the bag-shaped container member 2. The electrolyte (not shown) is held in the electrode group 1.

The bag-shaped container member 2 is made of a laminate film including two resin layers and a metal layer sandwiched between the resin layers.

As shown in FIG. 4, the electrode group 1 is a wound electrode group in a flat form. The wound electrode group 1 in a flat form includes a negative electrode 3, a separator 4, and a positive electrode 5, as shown in FIG. 5. The separator 4 is sandwiched between the negative electrode 3 and the positive electrode 5.

The negative electrode 3 includes a negative electrode current collector 3a and a negative electrode active material-containing layer 3b. At the portion of the negative electrode 3 positioned outermost among the wound electrode group 1, the negative electrode active material-containing layer 3b is formed only on an inner surface of the negative electrode current collector 3a, as shown in FIG. 5. For the other portions of the negative electrode 3, negative electrode active material-containing layers 3b are formed on both of reverse surfaces of the negative electrode current collector 3a.

The positive electrode 5 includes a positive electrode current collector 5a and positive electrode active material-containing layers 5b formed on both of reverse surfaces of the positive electrode current collector 5a.

As shown in FIG. 4, a negative electrode terminal 6 and positive electrode terminal 7 are positioned in vicinity of the outer peripheral edge of the wound electrode group 1. The negative electrode terminal 6 is connected to a portion of the negative electrode current collector 3a positioned outermost. The positive electrode terminal 7 is connected to a portion of the positive electrode current collector 5a positioned outermost. The negative electrode terminal 6 and the positive electrode terminal 7 extend out from an opening of the bag-shaped container member 2. A thermoplastic resin layer is provided on the inner surface of the bag-shaped container member 2, and the opening is sealed by heat-sealing the resin layer.

Figure 7:
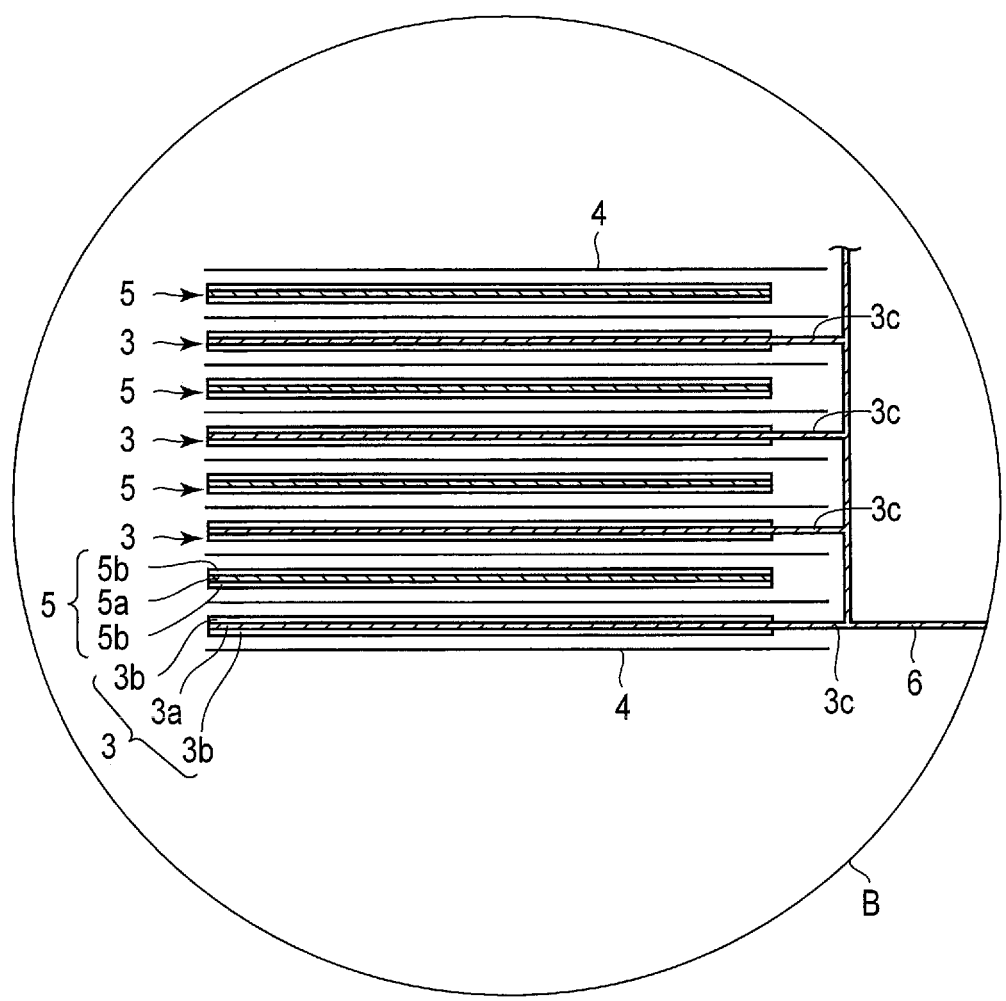
FIG. 7 is an enlarged cross-sectional view of a section B of the secondary battery illustrated in FIG. 6.

The secondary battery according to the third embodiment is not limited to the secondary battery of the structure shown in FIGS. 4 and 5, and may be, for example, a battery of a structure as shown in FIGS. 6 and 7.

FIG. 6 is a partially cut-out perspective view schematically showing another example of a secondary battery according to the third embodiment. FIG. 7 is an enlarged cross-sectional view of section B of the secondary battery shown in FIG. 6.

The secondary battery 100 shown in FIGS. 6 and 7 includes an electrode group 1 shown in FIGS. 6 and 7, a container member 2 shown in FIG. 6, and an electrolyte, which is not shown. The electrode group 1 and the electrolyte are housed in the container member 2. The electrolyte is held in the electrode group 1.

The container member 2 is made of a laminate film including two resin layers and a metal layer sandwiched between the resin layers. As shown in FIG. 7, the electrode group 1 is a stacked electrode group. The stacked electrode group 1 has a structure in which and negative electrodes 3 and positive electrodes 5 are alternately stacked with separator(s) 4 sandwiched therebetween.

The electrode group 1 includes plural negative electrodes 3. Each of the negative electrodes 3 includes the negative electrode current collector 3a and the negative electrode active material-containing layers 3b supported on both surfaces of the negative electrode current collector 3a. The electrode group 1 further includes plural positive electrodes 5. Each of the positive electrodes 5 includes the positive electrode current collector 5a and the positive electrode active material-containing layers 5b supported on both surfaces of the positive electrode current collector 5a.

The negative electrode current collector 3a of each of the negative electrodes 3 includes at one end, a portion 3c where the negative electrode active material-containing layer 3b is not supported on either surface. This portion 3c serves as a negative electrode tab. As shown in FIG. 7, the portions 3c serving as the negative electrode tabs do not overlap the positive electrodes 5. The plural negative electrode tabs (portions 3c) are electrically connected to the strip-shaped negative electrode terminal 6. A tip of the strip-shaped negative electrode terminal 6 is drawn to the outside from the container member 2.

Although not shown, the positive electrode current collector 5a of each of the positive electrodes 5 includes at one end, a portion where the positive electrode active material-containing layer 5b is not supported on either surface. This portion serves as a positive electrode tab. Like the negative electrode tabs (portion 3c), the positive electrode tabs do not overlap the negative electrodes 3. Further, the positive electrode tabs are located on the opposite side of the electrode group 1 with respect to the negative electrode tabs (portion 3c). The positive electrode tabs are electrically connected to the strip-shaped positive electrode terminal 7. A tip of the strip-shaped positive electrode terminal 7 is located on the opposite side relative to the negative electrode terminal 6 and drawn to the outside from the container member 2.

The secondary battery according to the third embodiment includes the active material according to the first embodiment as the negative electrode active material. Therefore, the secondary battery can exhibit excellent input-output characteristics and cycle life characteristics.

Fourth Embodiment

According to a fourth embodiment, a battery module is provided. The battery module according to the fourth embodiment includes plural secondary batteries according to the third embodiment.

In the battery module according to the fourth embodiment, each of the single batteries may be arranged electrically connected in series, in parallel, or in a combination of in-series connection and in-parallel connection.

An example of the battery module according to the fourth embodiment will be described next with reference to the drawings.

Figure 8:
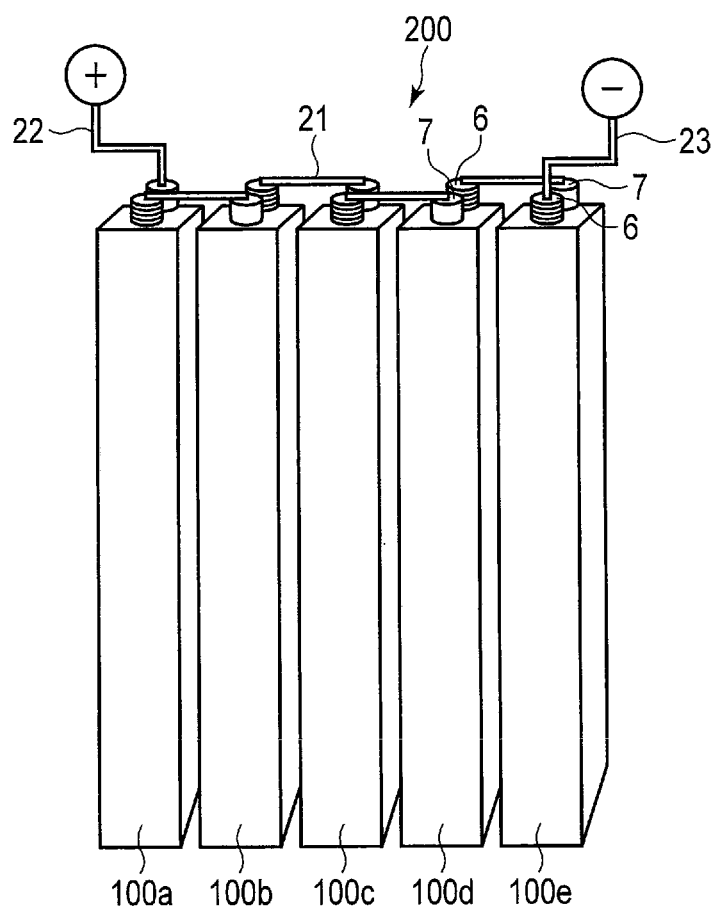
FIG. 8 is a perspective view schematically illustrating an example of a battery module according to an embodiment.

FIG. 8 is a perspective view schematically showing an example of the battery module according to the fourth embodiment. A battery module 200 shown in FIG. 8 includes five single-batteries 100a to 100e, four bus bars 21, a positive electrode-side lead 22, and a negative electrode-side lead 23. Each of the five single-batteries 100a to 100e is a secondary battery according to the third embodiment. The bus bars 21 connects a negative electrode terminal 6 of a single unit cell 100a to a positive electrode terminal 7 of an adjacently positioned unit cell 100b. In this way, the five unit cells 100a to 100e are connected in series by the four bus bars 21. That is, the battery module 200 shown in FIG. 8 is a battery module of five in-series connection. Although an example is not illustrated, in a battery module containing a plurality of unit cells electrically connected in parallel, the plurality of unit cells may be electrically connected by connecting the plurality of negative electrode terminals to each other with busbars and also connecting the plurality of positive electrode terminals to each other with busbars, for example.

The positive electrode terminal 7 of at least one battery among the five unit cells 100a to 100e is electrically connected to a positive electrode lead 22 for external connection. Also, the negative electrode terminal 6 of at least one battery among the five unit cells 100a to 100e is electrically connected to a negative electrode lead 23 for external connection.

The battery module according to the fourth embodiment includes the secondary battery according to the third embodiment. Therefore, the battery module can exhibit excellent input-output characteristics and cycle life characteristics.

Fifth Embodiment

According to the fifth embodiment, a battery pack is provided. The battery pack includes the battery module according to the fourth embodiment. The battery pack may also be equipped with a single secondary battery according to the third embodiment instead of the battery module according to the fourth embodiment.

The battery pack according to the fifth embodiment may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack according to the fifth embodiment may further include an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of a motive force of vehicles such as automobiles) is provided to the battery pack via the external power distribution terminal.

Next, an example of a battery pack according to the fifth embodiment will be described with reference to the drawings.

Figure 9:
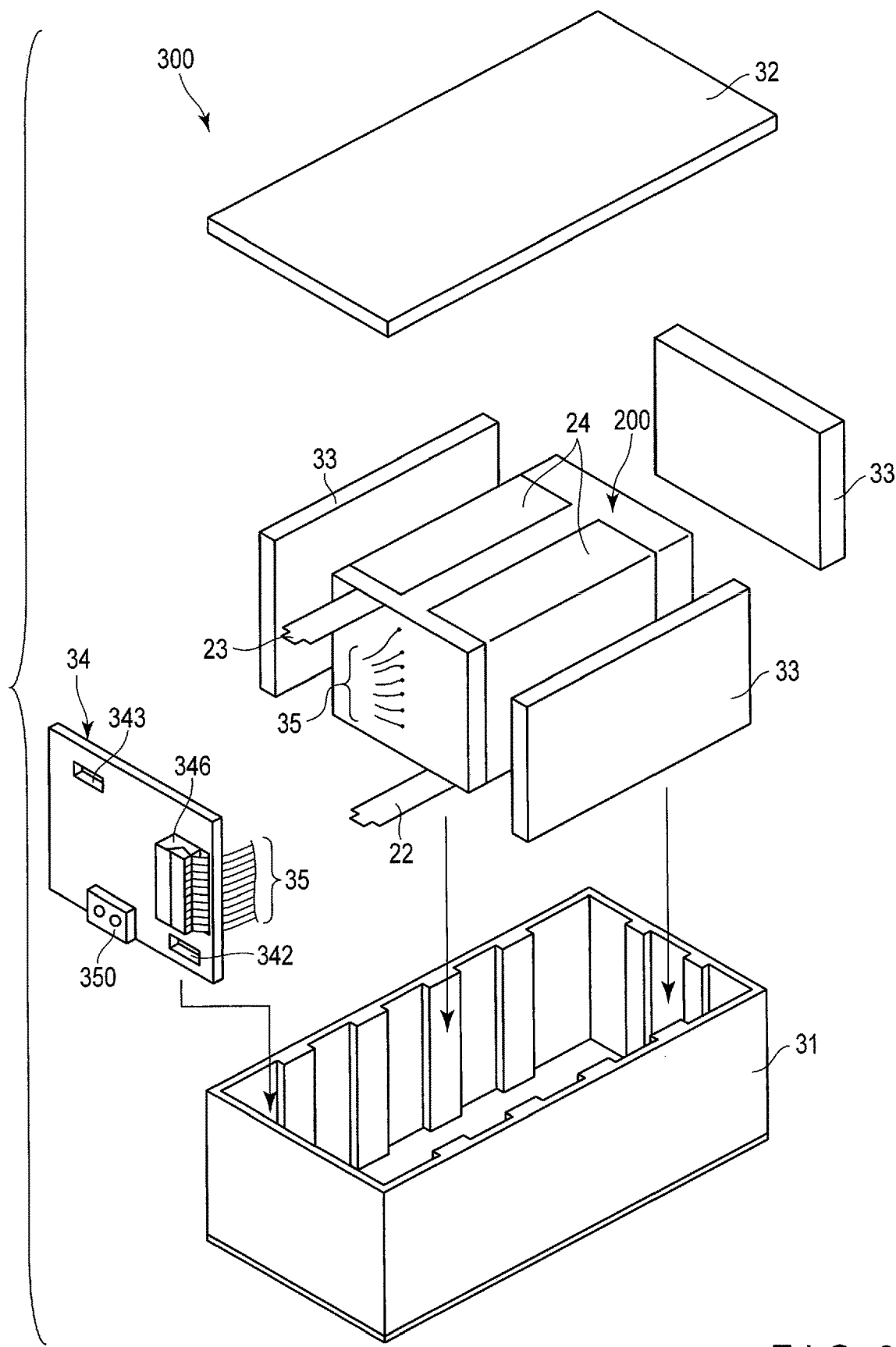
FIG. 9 is an exploded perspective view schematically illustrating an example of a battery pack according to an embodiment.
Figure 10:
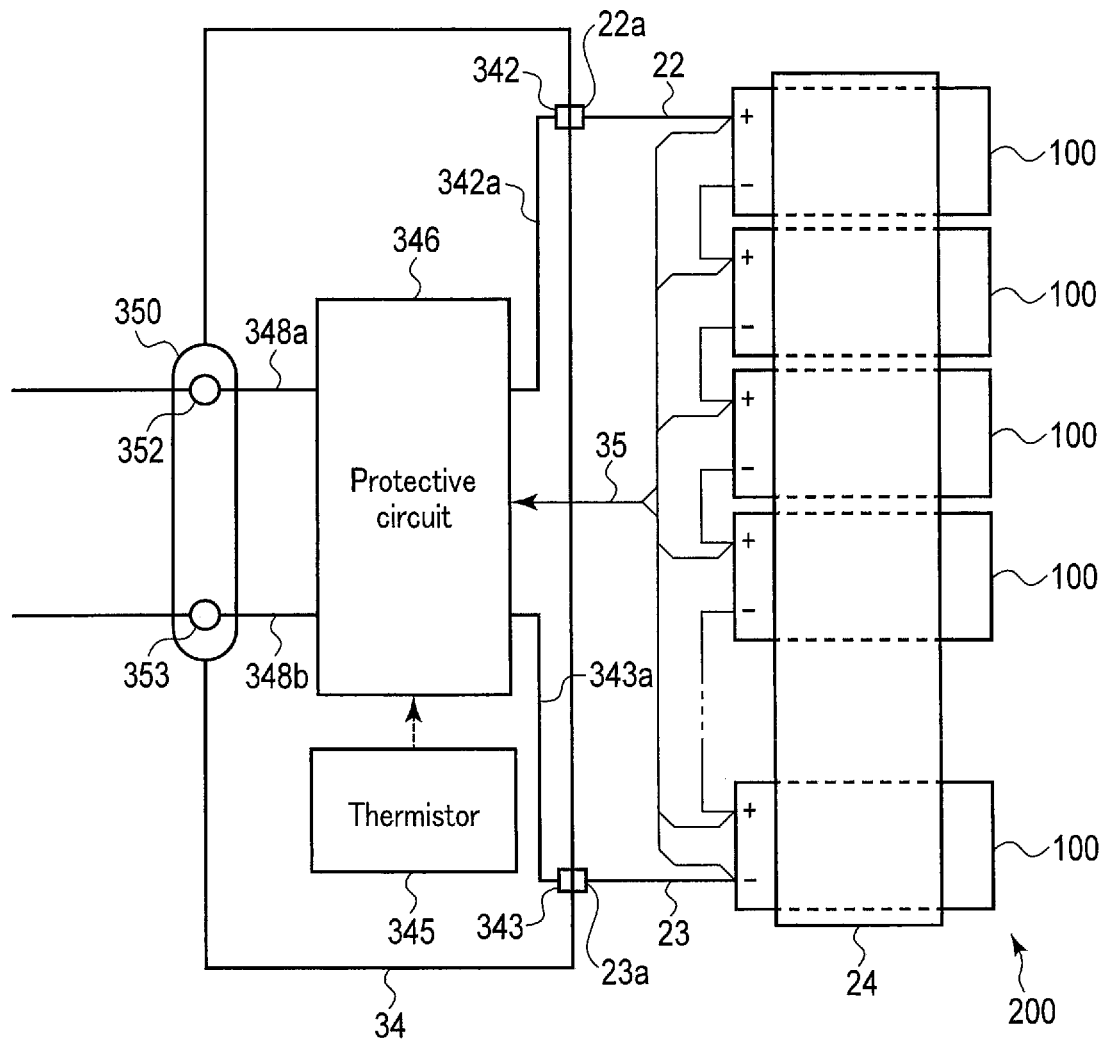
FIG. 10 is a block diagram illustrating an example of an electric circuit of the battery pack illustrated in FIG. 9.

FIG. 9 is an exploded perspective view schematically showing an example of the battery pack according to the fifth embodiment. FIG. 10 is a block diagram showing an example of an electric circuit of the battery pack shown in FIG. 9.

A battery pack 300 shown in FIGS. 9 and 10 includes a housing container 31, a lid 32, protective sheets 33, a battery module 200, a printed wiring board 34, wires 35, and an insulating plate (not shown).

A housing container 31 shown in FIG. 9 is a bottomed-square-shaped container having a rectangular bottom surface. The housing container 31 is configured to house protective sheet 33, a battery module 200, a printed wiring board 34, and wires 35. A lid 32 has a rectangular shape. The lid 32 covers the housing container 31 to house the battery module 200 and the like. Although not shown, opening(s) or connection terminal(s) for connecting to external device(s) and the like are provided on the housing container 31 and lid 32.

The battery module 200 includes plural unit cells 100, a positive electrode-side lead 22, a negative electrode-side lead 23, and an adhesive tape 24.

At least one in the plurality of unit cells 100 is a secondary battery according to the second embodiment. Each unit cell 100 in the plurality of unit cells 100 is electrically connected in series, as shown in FIG. 10. The plurality of unit cells 100 may alternatively be electrically connected in parallel, or connected in a combination of in-series connection and in-parallel connection. If the plurality of unit cells 100 is connected in parallel, the battery capacity increases as compared to a case where they are connected in series.

The adhesive tape 24 fastens the plural unit cells 100. The plural unit cells 100 may be fixed using a heat-shrinkable tape in place of the adhesive tape 24. In this case, the protective sheets 33 are arranged on both side surfaces of the battery module 200, and the heat-shrinkable tape is wound around the battery module 200 and protective sheets 33. After that, the heat-shrinkable tape is shrunk by heating to bundle the plural unit cells 100.

One terminal of a positive electrode lead 22 is connected to a battery module 200. One terminal of the positive electrode lead 22 is electrically connected to the positive electrode of one or more unit cells 100. One terminal of a negative electrode lead 23 is connected to the battery module 200. One terminal of the negative electrode lead 23 is electrically connected to the negative electrode of one or more unit cells 100.

The printed wiring board 34 is arranged on the inner surface of the housing container 31 along the short side direction. The printed wiring board 34 includes a positive electrode connector 342, a negative electrode connector 343, a thermistor 345, a protective circuit 346, wirings 342a and 343a, an external power distribution terminal 350, a plus-side wire (positive-side wire) 348a, and a minus-side wire (negative-side wire) 348b. One principal surface of the printed wiring board 34 faces one side surface of the battery module 200. An insulating plate (not shown) is disposed in between the printed wiring board 34 and the battery module 200.

The other terminal 22a of the positive electrode lead 22 is electrically connected to a positive electrode connector 342. The other terminal 23a of the negative electrode lead 23 is electrically connected to a negative electrode connector 343.

The thermistor 345 is fixed to one principal surface of the printed wiring board 34. The thermistor 345 detects the temperature of each unit cell 100 and transmits detection signals to the protective circuit 346.

The external power distribution terminal 350 is fixed to the other principal surface of the printed wiring board 34. The external power distribution terminal 350 is electrically connected to device(s) that exists outside the battery pack 300. The external power distribution terminal 350 includes a positive side terminal 352 and a negative side terminal 353.

The protective circuit 346 is fixed to the other principal surface of the printed wiring board 34. The protective circuit 346 is connected to the positive side terminal 352 via the plus-side wire 348a. The protective circuit 346 is connected to the negative side terminal 353 via the minus-side wire 348b. In addition, the protective circuit 346 is electrically connected to the positive electrode connector 342 via the wiring 342a. The protective circuit 346 is electrically connected to the negative electrode connector 343 via the wiring 343a. Furthermore, the protective circuit 346 is electrically connected to each unit cell 100 in the plurality of unit cells 100 via the wires 35.

The protective sheets 33 are arranged on both inner surfaces of the housing container 31 along the long side direction and on one inner surface of the housing container 31 along the short side direction facing the printed wiring board 34 through the battery module 200. The protective sheet 33 is made of, for example, resin or rubber.

The protective circuit 346 controls charging and discharging of the plurality of unit cells 100. The protective circuit 346 is also configured to cut off electric connection between the protective circuit 346 and the external power distribution terminal 350 (the positive side terminal 352 and the negative side terminal 353) to the external devices, based on detection signals transmitted from the thermistor 345 or detection signals transmitted from each unit cell 100 or the battery module 200.

An example of the detection signal transmitted from the thermistor 345 is a signal indicating that the temperature of the unit cell(s) 100 is detected to be a predetermined temperature or more. An example of the detection signal transmitted from each unit cell 100 or the battery module 200 is a signal indicating detection of over-charge, over-discharge, and overcurrent of the unit cell(s) 100. When detecting over-charge or the like for each of the unit cells 100, the battery voltage may be detected, or a positive electrode potential or negative electrode potential may be detected. In the latter case, a lithium electrode to be used as a reference electrode may be inserted into each unit cell 100.

Note, that as the protective circuit 346, a circuit included in a device (for example, an electronic device or an automobile) that uses the battery pack 300 as a power source may be used.

As described above, the battery pack 300 includes the external power distribution terminal 350. Hence, the battery pack 300 can output current from the battery module 200 to an external device and input current from an external device to the battery module 200 via the external power distribution terminal 350. In other words, when using the battery pack 300 as a power source, the current from the battery module 200 is supplied to an external device via the external power distribution terminal 350. When charging the battery pack 300, a charge current from an external device is supplied to the battery pack 300 via the external power distribution terminal 350. If the battery pack 300 is used as an onboard battery, the regenerative energy of the motive force of a vehicle can be used as the charge current from the external device.

Note that the battery pack 300 may include a plurality of battery modules 200. In this case, the plurality of battery modules 200 may be connected in series, in parallel, or connected in a combination of in-series connection and in-parallel connection. The printed wiring board 34 and the wires 35 may be omitted. In this case, the positive electrode lead 22 and the negative electrode lead 23 may be used as the positive side terminal and the negative side terminal of the external power distribution terminal, respectively.

Such a battery pack is used for, for example, an application required to have the excellent cycle performance when a large current is taken out. More specifically, the battery pack is used as, for example, a power source for electronic devices, a stationary battery, or an onboard battery for various kinds of vehicles. An example of the electronic device is a digital camera. The battery pack is particularly favorably used as an onboard battery.

The battery pack according to the fifth embodiment includes the secondary battery according to the third embodiment or the battery module according to the fourth embodiment. Therefore, the battery pack can exhibit excellent input-output characteristics and cycle life characteristics.

Sixth Embodiment

According to the sixth embodiment, a vehicle is provided. The vehicle includes the battery pack according to the fifth embodiment.

In a vehicle according to the sixth embodiment, the battery pack is configured, for example, to recover regenerative energy from motive force of the vehicle. The vehicle may include a mechanism configured to convert kinetic energy of the vehicle into regenerative energy.

Examples of the vehicle according to the sixth embodiment include two- to four-wheeled hybrid electric automobiles, two- to four-wheeled electric automobiles, electric assist bicycles, and railway cars.

In the vehicle, the installing position of the battery pack is not particularly limited. For example, the battery pack may be installed in the engine compartment of the vehicle, in rear parts of the vehicle, or under seats.

A plurality of battery packs is loaded on the vehicle. In this case, the batteries included in each of the battery packs may be electrically connected to each other in series, in parallel, or in a combination of in-series connection and in-parallel connection. For example, in the case where each battery pack includes a battery module, the battery modules may be electrically connected to each other in series, in parallel, or in a combination of in-series connection and in-parallel connection. Alternatively, in the case where each battery pack includes a single battery, each of the batteries may be electrically connected to each other in series, in parallel, or in a combination of in-series connection and in-parallel connection.

Next, one example of the vehicle according to the sixth embodiment will be described with reference to the drawings.

Figure 11:
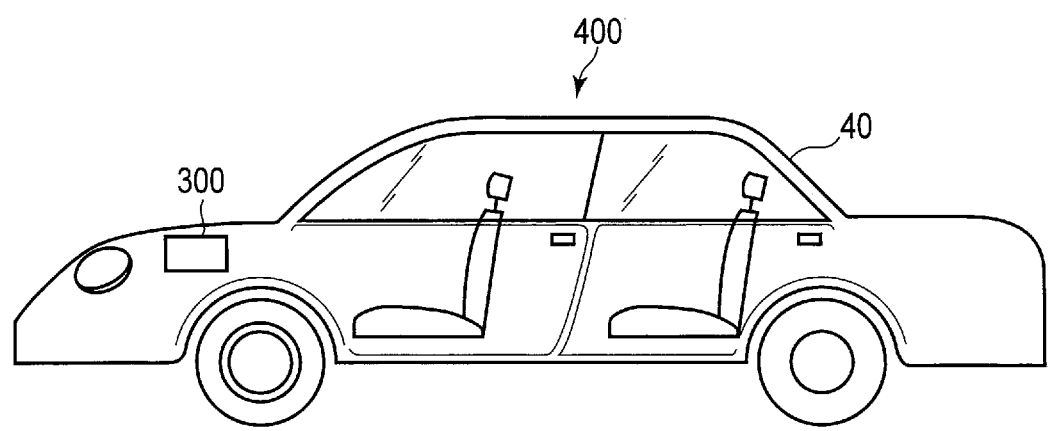
FIG. 11 is a cross-sectional view schematically illustrating an example of a vehicle according to an embodiment.

FIG. 11 is a partially transparent diagram schematically illustrating one example of a vehicle according to the embodiment.

A vehicle 400 illustrated in FIG. 11 includes a vehicle body 40 and a battery pack 300 according to the embodiment. In the example illustrated in FIG. 11, the vehicle 400 is a four-wheeled automobile.

A plurality of the battery packs 300 may be loaded on the vehicle 400. In this case, the batteries included in the battery packs 300 (for example, unit cell or battery modules) may be connected in series, connected in parallel, or connected in a combination of in-series connection and in-parallel connection.

In FIG. 11, the battery pack 300 is installed in an engine compartment located at the front of the vehicle body 40. As described above, the battery pack 300 may be installed in rear sections of the vehicle body 40, or under a seat. The battery pack 300 may be used as a power source of the vehicle 400. In addition, the battery pack 300 can recover regenerative energy of a motive force of the vehicle 400.

Next, an embodiment of the vehicle according to the sixth embodiment will be described with reference to FIG. 12.

Figure 12:
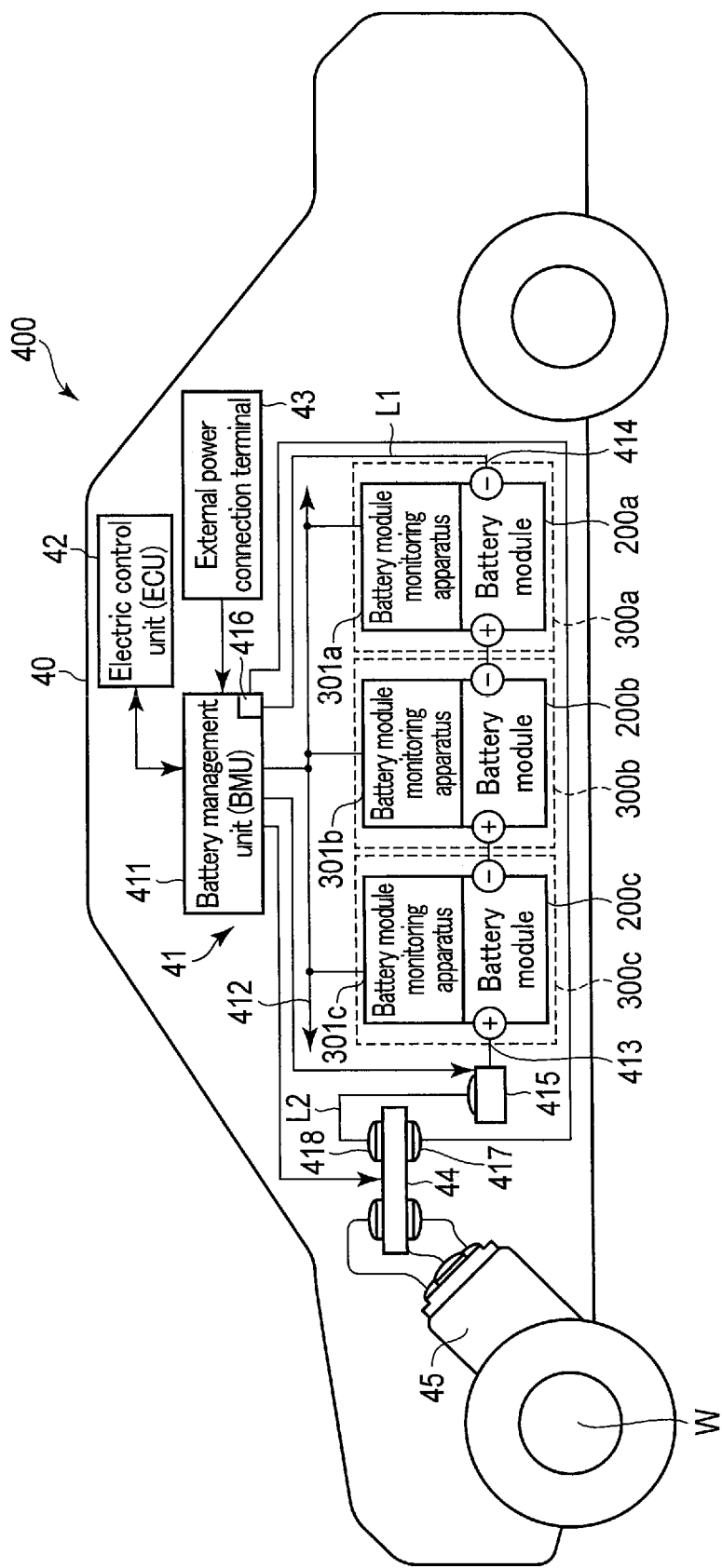
FIG. 12 is a diagram schematically illustrating another example of the vehicle according to the embodiment.

FIG. 12 is a diagram schematically illustrating one example of a control system related to an electrical system in the vehicle according to the sixth embodiment. The vehicle 400 illustrated in FIG. 12 is an electric automobile.

The vehicle 400, shown in FIG. 12, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 12, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

A battery pack 300a is provided with a battery module 200a and a battery module monitoring apparatus 301a (for example, voltage temperature monitoring (VTM)). A battery pack 300b is provided with a battery module 200b and a battery module monitoring apparatus 301b. A battery pack 300c is provided with a battery module 200c and a battery module monitoring apparatus 301c. The battery packs 300a to 300c are battery packs similar to the battery pack 300 described earlier, and the battery modules 200a to 200c are battery modules similar to the battery module 200 described earlier. The battery modules 200a to 200c are electrically connected in series. The battery packs 300a, 300b, and 300c are removable independently of each other, and each can be replaced with a different battery pack 300.

Each of the battery modules 200a to 200c includes plural battery cells connected in series. At least one of the plural battery cells is the secondary battery according to the second embodiment. The battery modules 200a to 200c each perform charging and discharging via a positive electrode terminal 413 and a negative electrode terminal 414.

A battery management apparatus 411 communicates with the battery module monitoring apparatus 301a to 301c, and collects information related to the voltage, temperature, and the like for each of the unit cells 100 included in the battery modules 200a to 200c included in the vehicle power source 41. With this arrangement, the battery management apparatus 411 collects information related to the maintenance of the vehicle power source 41.

The battery management apparatus 411 and the battery module monitoring apparatus 301a to 301c are connected via a communication bus 412. In the communication bus 412, a set of communication wires are shared with a plurality of nodes (the battery management apparatus 411 and one or more of the battery module monitoring apparatus 301a to 301c). The communication bus 412 is a communication bus, for example, configured in accordance with the controller area network (CAN) standard.

The battery module monitoring units 301a to 301c measure a voltage and a temperature of each battery cell in the battery modules 200a to 200c based on commands from the battery management unit 411. It is possible, however, to measure the temperatures only at several points per battery module, and the temperatures of all of the battery cells need not be measured.

The vehicle power source 41 can also have an electromagnetic contactor (for example, a switch apparatus 415 illustrated in FIG. 12) that switches the presence or absence of an electrical connection between a positive electrode terminal 413 and a negative electrode terminal 414. The switch apparatus 415 includes a pre-charge switch (not illustrated) that turns on when the battery modules 200a to 200c are charged, and a main switch (not illustrated) that turns on when the output from the battery modules 200a to 200c is supplied to the load. Each of the pre-charge switch and the main switch is provided with a relay circuit (not illustrated) that switches on or off according to a signal supplied to a coil disposed near a switching element. The electromagnetic contactor such as the switch apparatus 415 is controlled according to of control signals from the battery management apparatus 411 or the vehicle ECU 42 that controls the entire operation of the vehicle 400.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 is controlled based on control signals from the battery management apparatus 411, or the vehicle ECU 42 which controls the entire operation of the vehicle. By controlling the inverter 44, the output voltage from the inverter 44 is adjusted.

The drive motor 45 is rotated by electric power supplied from the inverter 44. The driving force produced by the rotation of the drive motor 45 is transmitted to an axle (or axles) and drive wheels W via a differential gear unit for example.

The vehicle 400 also includes a regenerative brake mechanism (regenerator), though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The converted direct current is inputted into the vehicle power source 41.

One terminal of a connection line L1 is connected to the negative electrode terminal 414 of the vehicle power source 41. The other terminal of the connection line L1 is connected to a negative electrode input terminal 417 of the inverter 44. On the connection line L1, a current detector (current detection circuit) 416 is provided inside the battery management apparatus 411 between the negative electrode terminal 414 and the negative electrode input terminal 417.

One terminal of a connection line L2 is connected to the positive electrode terminal 413 of the vehicle power source 41. The other terminal of the connection line L2 is connected to a positive electrode input terminal 418 of the inverter 44. On the connection line L2, the switch apparatus 415 is provided between the positive electrode terminal 413 and the positive electrode input terminal 418.

The external terminal 43 is connected to the battery management apparatus 411. The external terminal 43 can be connected to, for example, an external power source.

The vehicle ECU 42 cooperatively controls the vehicle power source 41, the switch apparatus 415, the inverter 44, and the like together with other management apparatus and control apparatus, including the battery management apparatus 411, in response to operation input from a driver or the like. By the cooperative control by the vehicle ECU 42 and the like, the output of electric power from the vehicle power source 41, the charging of the vehicle power source 41, and the like are controlled, and the vehicle 400 is managed as a whole. Data related to the maintenance of the vehicle power source 41, such as the remaining capacity of the vehicle power source 41, is transferred between the battery management apparatus 411 and the vehicle ECU 42 by a communication line.

The vehicle according to the sixth embodiment includes the battery pack according to the fifth embodiment. Therefore, the present embodiment can provide a vehicle equipped with the battery pack capable of exhibiting excellent input-output characteristics and cycle life characteristics.

EXAMPLES

Hereinafter, the above embodiments will be described in greater detail based on examples.

<Synthesis Method>

Example 1

An active material was synthesized by a solid phase synthesis method described below.

First, in order to obtain $Nb_2TiO_7$ as a main phase and $Nb_{10}Ti_2O_{29}$ as a coexisting phase, $Nb_2O_5$ particles and $TiO_2$ particles were mixed at a molar ratio of 1.1:1 using a dry ball mill, so that the Nb/Ti ratio became 2.2. The obtained powder was placed in an alumina crucible and heated at a temperature of 800° C. for 10 hours. Then, the powder was crushed and mixed, followed by pre-firing (first firing) at a temperature of 800° C. for 10 hours, to obtain precursor particles. Next, the obtained precursor particles were subjected to main firing (second firing) at 1000° C. for 5 hours. When the particle size distribution of the particles obtained after the main firing was examined, D10 was 0.3 μm or greater, and D90 was 10 μm or less.

Subsequently, potassium carbonate ($K_2CO_3$) and diammonium phosphate (($NH_4)_2HPO_4$) were added to the particles obtained after the main firing so that the concentrations of potassium (K) and phosphorus (P) in the active material particles finally obtained became 0.01% by mass and 0.001% by mass, respectively. The particles after the main firing to which the K source and the P source were added were subjected to wet mixing using pure water, to thereby obtain a wet mixture. Thereafter, the wet mixture was annealed to enhance the crystallinity. The annealing was performed at 900° C. for 3 hours. The powder thus obtained was crushed at 500 rpm for 10 minutes using a ball mill made of agate which adopted a crushing medium having a diameter of 10 mm. Thereby, an active material powder according to Example 1 was obtained.

Examples 2 to 10

Active material powders according to Examples 2 to 10 were obtained in the same manner as described in Example 1, except that the amounts of the K source and the P source added to the particles obtained after the main firing were changed so that active materials having the potassium concentrations and phosphorus concentrations shown in Table 1 below were obtained.

Example 11

An active material powder was obtained in the same manner as that described in Example 4, except that the annealing was performed at 800° C. for 1 hour.

Example 12

An active material powder was obtained in the same manner as that described in Example 4, except that the annealing was performed at 800° C. for 3 hours.

Example 13

An active material powder was obtained in the same manner as that described in Example 4, except that the annealing was performed at 900° C. for 5 hours.

Example 14

An active material powder was obtained in the same manner as that described in Example 4, except that the annealing was performed at 900° C. for 10 hours.

Example 15

An active material powder was obtained in the same manner as that described in Example 4, except that when mixing the Nb source and the Ti source as starting materials, the $Nb_2O_5$ particles and the $TiO_2$ particles were mixed at a molar ratio of 1.01:1 using a dry ball mill so that the Nb/Ti ratio became 2.02.

Example 16

An active material powder was obtained in the same manner as that described in Example 4, except that when mixing the Nb source and the Ti source as starting materials, the $Nb_2O_5$ particles and the $TiO_2$ particles were mixed at a molar ratio of 1.05:1 using a dry ball mill so that the Nb/Ti ratio became 2.1.

Example 17

An active material powder was obtained in the same manner as that described in Example 4, except that when mixing the Nb source and the Ti source as starting materials, the $Nb_2O_5$ particles and the $TiO_2$ particles were mixed at a molar ratio of 1.5:1 using a dry ball mill so that the Nb/Ti ratio became 3.0.

Example 18

An active material powder was obtained in the same manner as that described in Example 4, except that when mixing the Nb source and the Ti source as starting materials, the $Nb_2O_5$ particles and the $TiO_2$ particles were mixed at a molar ratio of 1.75:1 using a dry ball mill so that the Nb/Ti ratio became 3.5.

Example 19

An active material powder was obtained in the same manner as that described in Example 4, except that when mixing the Nb source and the Ti source as starting materials, the $Nb_2O_5$ particles and the $TiO_2$ particles were mixed at a molar ratio of 2:1 using a dry ball mill so that the Nb/Ti ratio became 4.0.

Example 20

A post-annealing powder was obtained by the method according to Example 14, and then coarse particles having a particle size of 10 μm or greater were removed through a sieve without the performance of crushing with an agate ball mill. In this manner, an active material powder with a reduced specific surface area was obtained.

Example 21

A post-annealing powder was obtained by the method according to Example 11, and then crushed at 600 rpm for 30 minutes with an agate ball mill which adopted a crushing medium having a diameter of 10 mm. Thereafter, fine particles having a particle size of 0.3 μm or less were removed by centrifugation. In this manner, an active material powder with an increased specific surface area was obtained.

Example 22

A post-annealing powder was obtained by the method according to Example 11, and then crushed at 800 rpm for 40 minutes using an agate ball which adopted a crushing medium having a diameter of 10 mm. Thereafter, fine particles having a particle size of 0.3 μm or less were removed by centrifugation. In this manner, an active material powder with an increased specific surface area was obtained.

Example 23

An active material powder was obtained in the same manner as that described in Example 17, except that an agate mortar was used instead of a dry ball mill when mixing the Nb source and the Ti source as starting materials. When mild mixing with an agate mortar is performed instead of dry mixing in which a strong shear is applied as in the case of using a ball mill, a solid-phase reaction to deliver local richness in niobium progresses. Therefore, $Nb_{14}TiO_{37}$ is generated as a coexisting phase.

Example 24

An active material powder was obtained in the same manner as that described in Example 19, except that an agate mortar was used instead of a dry ball mill when mixing the Nb source and the Ti source as starting materials. When mild mixing with an agate mortar is performed instead of dry mixing in which a strong shear is applied as in the case of using a ball mill, a solid-phase reaction to deliver local richness in niobium progresses. Therefore, $Nb_{24}TiO_{64}$ is generated as a coexisting phase.

Comparative Example 1

An active material powder was obtained in the same manner as that described in Example 1, except that only potassium carbonate ($K_2CO_3$) was added to the particles obtained after the main firing so that the potassium (K) concentration in the active material particles ultimately obtained became 0.07% by mass.

Comparative Example 2

An active material powder was obtained in the same manner as that described in Example 1, except that only diammonium phosphate (($NH_4$)$_2HPO_4$) was added to the particles obtained after the main firing so that the phosphorus (P) concentration in the active material particles ultimately obtained became 0.009% by mass.

Comparative Example 3

An active material powder was obtained in the same manner as that described in Example 1, except that potassium carbonate ($K_2CO_3$) and diammonium phosphate (($NH_4$)$_2HPO_4$) were added to the particles obtained after the main firing so that the concentrations of potassium (K) and phosphorus (P) in the active material particles ultimately obtained became 5.0% by mass and 2.0% by mass, respectively.

Comparative Example 4

An active material powder was obtained in the same manner as that described in Example 1, except that wet mixing using pure water was performed without adding either the K source or the P source.

Comparative Example 5

An active material powder was obtained in the same manner as that described in Example 1, except that instead of adding the K source and the P source, sodium carbonate ($Na_2CO_3$) and iron chloride ($FeCl_2$) were added to the particles obtained after the main firing so that both the concentrations of sodium (Na) and iron (Fe) in the active material particles ultimately obtained became 0.05% by mass.

Comparative Example 6

The powder obtained after the annealing by the method according to Example 14 was used as an active material powder of Comparative Example 6. Namely, in Comparative Example 6, the crushing was not performed after the annealing.

Comparative Example 7

A post-annealing powder was obtained by the method according to Example 4, and then crushed by passing the powder three times through a dry bead mill apparatus which adopted a crushing medium having a diameter of 3 mm, thereby obtaining an active material powder.

Comparative Example 8

An active material powder was obtained in the same manner as that described in Example 4, except that when mixing the Nb source and the Ti source as starting materials, the $Nb_2O_5$ particles and the $TiO_2$ particles were mixed at a molar ratio of 1:1 so that the Nb/Ti ratio became 2.00, in order to obtain only the $Nb_2TiO_7$ phase.

Comparative Example 9

An active material powder of Comparative Example 9 was produced in the same manner as that described in Example 1, except that the following operation was performed.

When mixing the Nb source and the Ti source as starting materials, the $Nb_2O_5$ particles and the $TiO_2$ particles were mixed at a molar ratio of 1:1 so that the Nb/Ti ratio became 2.00, in order to obtain only the $Nb_2TiO_7$ phase. Also, when adding the K source and the P source, potassium carbonate ($K_2CO_3$) and diammonium phosphate (($NH_4$)$_2HPO_4$) were added to the particles obtained after the main firing so that the concentrations of potassium (K) and phosphorus (P) in the active material particles finally obtained became 5.0% by mass and 2.0% by mass, respectively.

Comparative Example 10

An active material powder was obtained in the same manner as that described in Example 4, except that when mixing the Nb source and the Ti source as starting materials, the $Nb_2O_5$ particles and the $TiO_2$ particles were mixed at a molar ratio of 2.25:1 using a dry ball mill so that the Nb/Ti ratio became 4.5.

Comparative Example 11

First, in order to obtain $Nb_2TiO_7$ as a main phase and $Nb_{10}Ti_2O_{29}$ as a coexisting phase, $Nb_2O_5$ particles and $TiO_2$ particles were mixed at a molar ratio of 1.1:1 using a dry ball mill, so that the Nb/Ti ratio became 2.2. The obtained powder was placed in an alumina crucible and heated at a temperature of 800° C. for 10 hours. Then, the powder was crushed and mixed, followed by pre-firing (first firing) at a temperature of 800° C. for 10 hours, to obtain precursor particles.

Next, potassium carbonate ($K_2CO_3$) and diammonium phosphate (($NH_4$)$_2HPO_4$) were added to the precursor particles so that the concentrations of potassium (K) and phosphorus (P) in the active material particles finally obtained became 0.07% by mass and 0.009% by mass, respectively. The precursor particles to which the K source and the P source were added were subjected to wet mixing using pure water, to thereby obtain a wet mixture.

Then, the wet mixture obtained was subjected to main firing (second firing) at a temperature of 1150° C. for 3 hours. The powder thus obtained was crushed at 500 rpm for 30 minutes using a ball mill made of agate which adopted a crushing medium having a diameter of 10 mm. Thereby, an active material powder according to Comparative Example 11 was obtained.

Comparative Example 12

First, in order to obtain a $Nb_2TiO_7$ phase as a main phase, $Nb_2O_5$ particles and $TiO_2$ particles were mixed at a molar ratio of 1:1 using a dry ball mill. The obtained powder was placed in an alumina crucible and subjected to pre-firing at a temperature of 800° C. for 12 hours. The powder obtained after the pre-firing was placed in a platinum crucible and subjected to main firing at a temperature of 1200° C. for 5 hours. The resultant powder was crushed in an agate mortar and then sieved through a 25-μm mesh, to obtain $Nb_2TiO_7$ particles.

Next, in order to obtain a $Nb_{10}Ti_2O_{29}$ phase as a subphase, pre-firing, main firing, and sieving were performed in the same manner as that adopted when producing the above main phase, except that the molar ratio of $Nb_2O_5$ particles and $TiO_2$ particles was set to 2.5:1; thereby, $Nb_{10}Ti_2O_{29}$ particles were obtained. The $Nb_{10}Ti_2O_{29}$ particles thus obtained were mixed with the $Nb_2TiO_7$ particles produced in advance so that the content of the $Nb_{10}Ti_2O_{29}$ particles became 0.5% by mass, thereby obtaining a mixture thereof.

Potassium carbonate ($K_2CO_3$) and diammonium phosphate (($NH_4$)$_2HPO_4$) were added to the obtained mixture so that the concentrations of potassium (K) and phosphorus (P) in the active material particles finally obtained became 0.01% by mass and 0.001% by mass, respectively. The mixture to which the K source and the P source were added was subjected to wet mixing with the use of pure water, to thereby obtain a wet mixture. Thereafter, the wet mixture was annealed at 900° C. for 3 hours.

The powder thus obtained was crushed at 500 rpm for 10 minutes using an agate ball mill which adopted a crushing medium having a diameter of 10 mm. Thereby, an active material powder according to Comparative Example 12 was obtained.

<Electrochemical Measurement>

Cells for electrochemical measurement were produced in the procedure described below using the active materials obtained in the respective Examples.

100% by mass of the active material powder obtained in each example, 10% by mass of acetylene black as a conductive agent, 5% by mass of carbon nanofiber, 10% by mass of polyvinylidene fluoride (PVdF) as a binder were added with N-methylpyrrolidone (NMP) and mixed to obtain a slurry. This slurry was applied to one side of a current collector made of an aluminum foil having a thickness of 12 μm, and then, was subjected to drying and pressing, thereby producing an electrode having an electrode density of 2.4 g/cm$^3$.

Separately, an electrolytic solution was prepared by dissolving LiPF$_6$ as a supporting salt, at a concentration of 1 mol/L, in a mixed solvent in which ethylene carbonate (EC) and diethyl carbonate (DEC) were mixed at a volume ratio of 1:2.

The obtained electrode was used as a working electrode and Li metal was used as a counter electrode and also Li metal was used as a reference electrode to produce a three-electrode-type beaker cell using the obtained electrolytic solution, and electrochemical characteristics thereof ware evaluated as described below.

In the present examples, since the lithium metal is used as the counter electrode in the three-electrode-type beaker cell for measurement, electrode potentials of the examples and the comparative examples are nobler than that of the counter electrode, and thus, operate as a positive electrode. Thus, the definitions of charging and discharging become opposite when the electrodes of the examples and the comparative examples are used as a negative electrode. Here, in the present examples, directions in which lithium ions are inserted into the electrode are collectively referred to as charging, and directions of extracting lithium ions from the electrode are consistently referred to as discharging in order to avoid confusion. Incidentally, the active materials of the present embodiments operate as a negative electrode by combining with a known positive electrode material.

The prepared electrochemical measurement cell was charged and discharged in a potential range of 1.0 V to 3.0 V (vs. Li/Li$^+$) with respect to metallic lithium electrode. A charge/discharge current value was set to 0.2 C (hourly discharge rate), and 0.2 C discharge capacity was confirmed at room temperature. The value of 0.2 C discharge capacity is an index of energy density. In addition, in order to investigate the rapid discharge characteristics, after confirmation of the 0.2 C discharge capacity, the battery was charged again with the charge current value set to 0.2 C to confirm 5 C rapid discharge capacity at room temperature. Then, a discharge capacity ratio (5 C/0.2 C) was obtained by dividing the 5 C discharge capacity by the 0.2 C discharge capacity. The discharge capacity ratio (5 C/0.2 C) serves as an index for evaluating the rapid charge-discharge characteristics.

Next, in order to confirm that the electrode materials (negative electrode materials) according to the Examples could be charged and discharged stably, the cells of the Examples and the Comparative Examples were subjected to a life test in a 45° C. environment by repeating 0.2 C charge and discharge in a potential range of 1.0 V to 3.0 V (vs. Li/Li$^+$) with respect to metallic lithium electrode. In the stage where the initial charge and discharge were completed, a value of the alternating-current impedance of the cells at 1 kHz was measured. Thereafter, the charging and discharging were repeated 100 cycles (the charging and discharging is defined as one cycle), and a discharge capacity retention ratio and Resistance Increase Rate after 100 cycles was investigated. In order to confirm the discharge capacity retention ratio after 100 cycles, the charging and discharging were performed again at 0.2 C (hourly discharge rate), a cycle capacity retention ratio (%) in a case where an initial discharge capacity is 100% was calculated by dividing the discharge capacity after 100 cycles by an initial discharge capacity and multiplying by 100. Likewise, a value of the alternating-current impedance at 1 kHz was measured after 100 cycles, and the measured value was divided by a value of the alternating-current impedance after the initial charge and discharge to calculate the resistance increase rate (multiple). The discharge capacity retention ratio and Resistance Increase Rate after 100 cycles serves as an index for evaluating the cycle life characteristics.

<Various Evaluations>

Powder X-ray diffraction, Rietveld analysis, ICP emission spectrometric analysis, TEM observation, measurement of the specific surface area by the BET method, and laser diffraction scattering method were performed on the active material powders obtained in the respective Examples, according to the methods described in the First Embodiment.

The results are shown in Tables 1 to 4 below. In regard to Comparative Example 5, a sodium concentration is shown instead of a potassium concentration in the column labeled "K Concentration". Also, an iron concentration is shown instead of a phosphorus concentration in the column labeled "P Concentration".

TABLE 1

| | Main Phase | Coexisting Phase | K Concentration $C_k$ (mass %) | P Concentration $C_p$ (mass %) | Ratio $C_K/C_P$ | Total Concentration of K and P (mass %) |
|---|---|---|---|---|---|---|
| Example 1 | Nb$_2$TiO$_7$ | Nb$_{10}$Ti$_2$O$_{29}$ | 0.01 | 0.001 | 10 | 0.011 |
| Example 2 | Nb$_2$TiO$_7$ | Nb$_{10}$Ti$_2$O$_{29}$ | 0.005 | 0.005 | 1 | 0.01 |
| Example 3 | Nb$_2$TiO$_7$ | Nb$_{10}$Ti$_2$O$_{29}$ | 0.05 | 0.05 | 1 | 0.1 |
| Example 4 | Nb$_2$TiO$_7$ | Nb$_{10}$Ti$_2$O$_{29}$ | 0.07 | 0.009 | 7.8 | 0.079 |
| Example 5 | Nb$_2$TiO$_7$ | Nb$_{10}$Ti$_2$O$_{29}$ | 0.1 | 0.005 | 20 | 0.105 |
| Example 6 | Nb$_2$TiO$_7$ | Nb$_{10}$Ti$_2$O$_{29}$ | 0.2 | 0.005 | 40 | 0.205 |
| Example 7 | Nb$_2$TiO$_7$ | Nb$_{10}$Ti$_2$O$_{29}$ | 0.5 | 0.01 | 50 | 0.51 |
| Example 8 | Nb$_2$TiO$_7$ | Nb$_{10}$Ti$_2$O$_{29}$ | 1 | 0.1 | 10 | 1.1 |
| Example 9 | Nb$_2$TiO$_7$ | Nb$_{10}$Ti$_2$O$_{29}$ | 2 | 0.5 | 4 | 2.5 |
| Example 10 | Nb$_2$TiO$_7$ | Nb$_{10}$Ti$_2$O$_{29}$ | 4 | 1 | 4 | 5.0 |
| Example 11 | Nb$_2$TiO$_7$ | Nb$_{10}$Ti$_2$O$_{29}$ | 0.07 | 0.009 | 7.8 | 0.079 |
| Example 12 | Nb$_2$TiO$_7$ | Nb$_{10}$Ti$_2$O$_{29}$ | 0.07 | 0.009 | 7.8 | 0.079 |
| Example 13 | Nb$_2$TiO$_7$ | Nb$_{10}$Ti$_2$O$_{29}$ | 0.07 | 0.009 | 7.8 | 0.079 |
| Example 14 | Nb$_2$TiO$_7$ | Nb$_{10}$Ti$_2$O$_{29}$ | 0.07 | 0.009 | 7.8 | 0.079 |

TABLE 1-continued

| | Main Phase | Coexisting Phase | K Concentration $C_k$ (mass %) | P Concentration $C_p$ (mass %) | Ratio $C_K/C_P$ | Total Concentration of K and P (mass %) |
|---|---|---|---|---|---|---|
| Example 15 | $Nb_2TiO_7$ | $Nb_{10}Ti_2O_{29}$ | 0.07 | 0.009 | 7.8 | 0.079 |
| Example 16 | $Nb_2TiO_7$ | $Nb_{10}Ti_2O_{29}$ | 0.07 | 0.009 | 7.8 | 0.079 |
| Example 17 | $Nb_2TiO_7$ | $Nb_{10}Ti_2O_{29}$ | 0.07 | 0.009 | 7.8 | 0.079 |
| Example 18 | $Nb_2TiO_7$ | $Nb_{10}Ti_2O_{29}$ | 0.07 | 0.009 | 7.8 | 0.079 |
| Example 19 | $Nb_2TiO_7$ | $Nb_{10}Ti_2O_{29}$ | 0.07 | 0.009 | 7.8 | 0.079 |
| Example 20 | $Nb_2TiO_7$ | $Nb_{10}Ti_2O_{29}$ | 0.07 | 0.009 | 7.8 | 0.079 |
| Example 21 | $Nb_2TiO_7$ | $Nb_{10}Ti_2O_{29}$ | 0.07 | 0.009 | 7.8 | 0.079 |
| Example 22 | $Nb_2TiO_7$ | $Nb_{10}Ti_2O_{29}$ | 0.07 | 0.009 | 7.8 | 0.079 |
| Example 23 | $Nb_2TiO_7$ | $Nb_{14}TiO_{37}$ | 0.07 | 0.009 | 7.8 | 0.079 |
| Example 24 | $Nb_2TiO_7$ | $Nb_{24}TiO_{64}$ | 0.07 | 0.009 | 7.8 | 0.079 |

TABLE 2

| | Crystallite Size (nm) | Peak Intensity Ratio IB/IA | Average Particle Size D10 (μm) | Average Particle Size D90 (μm) | Specific Surface Area (m²/g) | 0.2 C Discharge Capacity (mAh/g) | 5 C/0.2 C Discharge Capacity Ratio | Cycle Capacity Retention Ratio (%) | Resistance Increase Rate (multiple) |
|---|---|---|---|---|---|---|---|---|---|
| Example 1 | 98 | 0.01 | 0.3 | 10 | 4.6 | 268.5 | 0.82 | 90.2 | 1.25 |
| Example 2 | 101 | 0.01 | 0.4 | 8.6 | 4.2 | 271.6 | 0.85 | 92.3 | 1.21 |
| Example 3 | 105 | 0.01 | 0.6 | 7.5 | 4 | 273.9 | 0.92 | 94.5 | 1.18 |
| Example 4 | 110 | 0.01 | 0.6 | 6.8 | 3.9 | 279.1 | 0.95 | 97.7 | 1.05 |
| Example 5 | 103 | 0.01 | 0.5 | 6 | 3.8 | 277.3 | 0.94 | 96.9 | 1.1 |
| Example 6 | 110 | 0.01 | 0.5 | 6.4 | 3.5 | 275.7 | 0.92 | 97.1 | 1.08 |
| Example 7 | 112 | 0.01 | 0.6 | 6.9 | 3.5 | 273.4 | 0.92 | 95.3 | 1.15 |
| Example 8 | 114 | 0.01 | 0.6 | 7.1 | 3.6 | 272.8 | 0.9 | 94.2 | 1.22 |
| Example 9 | 115 | 0.01 | 0.8 | 8.8 | 3.3 | 271.7 | 0.89 | 93.4 | 1.23 |
| Example 10 | 118 | 0.01 | 0.8 | 9.7 | 3.2 | 269.2 | 0.85 | 89.6 | 1.35 |
| Example 11 | 90 | 0.01 | 0.3 | 5 | 5.8 | 267.6 | 0.88 | 88.1 | 1.44 |
| Example 12 | 95 | 0.01 | 0.4 | 5.5 | 4.5 | 269 | 0.9 | 92 | 1.41 |
| Example 13 | 115 | 0.01 | 0.8 | 8.6 | 3.2 | 272.4 | 0.93 | 94.7 | 1.09 |
| Example 14 | 120 | 0.01 | 1 | 10 | 2.1 | 276.1 | 0.89 | 98.1 | 1.04 |
| Example 15 | 109 | 0.001 | 0.3 | 6.2 | 3.9 | 271.5 | 0.92 | 91.9 | 1.29 |
| Example 16 | 110 | 0.005 | 0.6 | 6.7 | 3.7 | 275.8 | 0.92 | 95.7 | 1.18 |
| Example 17 | 112 | 0.10 | 0.6 | 6.7 | 3.7 | 278.2 | 0.93 | 93.8 | 1.23 |
| Example 18 | 114 | 0.20 | 0.6 | 6.6 | 3.6 | 272.7 | 0.91 | 92.4 | 1.31 |
| Example 19 | 109 | 0.25 | 0.6 | 6.6 | 3.7 | 268.8 | 0.9 | 90.1 | 1.43 |
| Example 20 | 120 | 0.01 | 1 | 10 | 0.9 | 270.6 | 0.83 | 98.3 | 1.03 |
| Example 21 | 85 | 0.01 | 0.3 | 3.8 | 9.6 | 265.1 | 0.92 | 86.6 | 1.54 |
| Example 22 | 60 | 0.01 | 0.3 | 2.3 | 13.5 | 264.9 | 0.94 | 83.6 | 1.62 |
| Example 23 | 109 | 0.01 | 0.6 | 7 | 3.8 | 277.5 | 0.93 | 97.1 | 1.07 |
| Example 24 | 111 | 0.01 | 0.6 | 6.9 | 3.9 | 276.7 | 0.92 | 96.9 | 1.06 |

TABLE 3

| | Main Phase | Coexisting Phase | K Concentration $C_k$ (mass %) | P Concentration $C_p$ (mass %) | Ratio $C_K/C_P$ | Total Concentration of K and P (mass %) |
|---|---|---|---|---|---|---|
| Comparative Example 1 | $Nb_2TiO_7$ | $Nb_{10}Ti_2O_{29}$ | 0.07 | 0 | — | 0.07 |
| Comparative Example 2 | $Nb_2TiO_7$ | $Nb_{10}Ti_2O_{29}$ | 0 | 0.009 | — | 0.009 |
| Comparative Example 3 | $Nb_2TiO_7$ | $Nb_{10}Ti_2O_{29}$ | 5 | 2 | 2.5 | 7 |
| Comparative Example 4 | $Nb_2TiO_7$ | $Nb_{10}Ti_2O_{29}$ + Impurity phase | 0 | 0 | — | 0 |
| Comparative Example 5 | $Nb_2TiO_7$ | $Nb_{10}Ti_2O_{29}$ | Na 0.05 | Fe 0.05 | — | 0.1 |
| Comparative Example 6 | $Nb_2TiO_7$ | $Nb_{10}Ti_2O_{29}$ | 0.07 | 0.009 | 7.8 | 0.079 |
| Comparative Example 7 | $Nb_2TiO_7$ | $Nb_{10}Ti_2O_{29}$ | 0.07 | 0.009 | 7.8 | 0.079 |
| Comparative Example 8 | $Nb_2TiO_7$ | — | 0.07 | 0.009 | 7.8 | 0.079 |
| Comparative Example 9 | $Nb_2TiO_7$ | — | 5 | 2 | 2.5 | 7 |

TABLE 3-continued

|  | Main Phase | Coexisting Phase | K Concentration $C_k$ (mass %) | P Concentration $C_P$ (mass %) | Ratio $C_K/C_P$ | Total Concentration of K and P (mass %) |
|---|---|---|---|---|---|---|
| Comparative Example 10 | $Nb_2TiO_7$ | $Nb_{10}Ti_2O_{29}$ | 0.07 | 0.009 | 7.8 | 0.079 |
| Comparative Example 11 | $Nb_2TiO_7$ | $Nb_{10}Ti_2O_{29}$ | 0.07 | 0.009 | 7.8 | 0.079 |
| Comparative Example 12 | $Nb_2TiO_7$ | $Nb_{10}Ti_2O_{29}$ | 0.07 | 0.009 | 7.8 | 0.079 |

TABLE 4

|  | Crystallite Size (nm) | Peak Intensity Ratio $I_B/I_A$ | Average Particle Size D10 (μm) | Average Particle Size D90 (μm) | Specific Surface Area (m²/g) | 0.2 C Discharge Capacity (mAh/g) | 5 C/0.2 C Discharge Capacity Ratio | Cycle Capacity Retention Ratio (%) | Resistance Increase Rate (multiple) |
|---|---|---|---|---|---|---|---|---|---|
| Comparative Example 1 | 75 | 0.01 | 0.25 | 3.1 | 8.9 | 260.7 | 0.77 | 75.2 | 2.15 |
| Comparative Example 2 | 72 | 0.01 | 0.18 | 2.3 | 10.5 | 259.5 | 0.75 | 70.3 | 2.34 |
| Comparative Example 3 | 115 | 0.01 | 0.9 | 12.3 | 2.6 | 271.3 | 0.69 | 79.9 | 1.85 |
| Comparative Example 4 | 65 | 0.01 | 0.15 | 1.25 | 23.6 | 247.1 | 0.51 | 62.5 | 2.55 |
| Comparative Example 5 | 78 | 0.01 | 0.3 | 6.4 | 3.5 | 261.2 | 0.75 | 68.7 | 1.98 |
| Comparative Example 6 | 120 | 0.01 | 1 | 13.8 | 2.5 | 278.2 | 0.71 | 80.8 | 1.81 |
| Comparative Example 7 | 78 | 0.01 | 0.18 | 2.1 | 15.8 | 269.5 | 0.79 | 66.5 | 2.36 |
| Comparative Example 8 | 97 | — | 0.2 | 6.6 | 4.2 | 270.5 | 0.8 | 74.2 | 2.03 |
| Comparative Example 9 | 110 | — | 0.3 | 6.8 | 3.4 | 267.7 | 0.76 | 80.1 | 1.88 |
| Comparative Example 10 | 108 | 0.3 | 0.6 | 6.5 | 3.8 | 262.4 | 0.81 | 83.2 | 1.72 |
| Comparative Example 11 | 112 | 0.01 | 0.18 | 14.8 | 8.5 | 263.9 | 0.65 | 69.2 | 2.72 |
| Comparative Example 12 | 120 | 0.01 | 1.25 | 27.3 | 0.98 | 270.9 | 0.55 | 79.7 | 2.04 |

As shown in Examples 1 to 24, secondary batteries including the active material according to the embodiment not only exhibited excellent input-output characteristics and cycle life characteristics, but also exhibited an excellent battery capacity. As shown in Examples 4 to 7, for example, when the ratio ($C_K/C_P$) of the potassium concentration $C_K$ to the phosphorus concentration $C_P$ is in the range of 2.0 to 50.0, both the effect of crystal growth and the effect of suppressing particle growth were obtained in a well-balanced manner, and excellent battery characteristics were achieved due to smooth electrochemical reaction occurring in the electrode. In Examples 12 and 13, in which D10 was 0.4 μm or greater and D90 was 9.0 μm or less, both the rate characteristics and the cycle life characteristics exhibited excellence in a well-balanced manner.

When potassium and phosphorus were not added as in the case of Comparative Example 4, since the depression of the melting point did not occur, the reactivity was low even when the annealing was performed. Therefore, active material particles including an unreacted impurity phase and having a small crystallite size were obtained. When sodium and iron were included in a predetermined amount as in the case of Comparative Example 5, particle physicality equivalent to that of the Examples was exhibited due to the depression of the melting point; however, sodium and iron largely influenced the deterioration of the battery characteristics.

In Comparative Example 6, the battery characteristics were poor, including insufficient formation of an electron-conducting path, because the particles were not sufficiently cracked and D90 was excessively large. On the other hand, in Comparative Example 7, excessive crushing of the active material powder led to decreased crystallinity and increased specific surface area, causing considerable degradation of the cycle life characteristics.

When the Nb-rich phase was not included, as shown in Comparative Example 8, the stability of the crystal lattice during charge and discharge decreased, resulting in poor battery characteristics. On the other hand, instances of many Nb-rich phases produced an excessive effect of strengthening the bond between oxide ions and Nb ions constituting the skeleton, as shown in Comparative Example 10; thus, the movement of lithium ions was prevented, resulting in degradation of battery characteristics.

When a mixture including potassium and phosphorus at a predetermined concentration is fired at a high temperature for a long time as in the case of Comparative Example 11, the crystal growth does proceed, but in tandem with the particle growth also. Therefore, coarse particles which are difficult to crush are generated. When a powder including such coarse particles is crushed in a ball mill, the amount of fine powder generated when the coarse particles are crushed increases. Therefore, D10 was as small as 0.18 µm, and D90 was 10 µm or greater as many coarse particles remain. Therefore, the rate characteristics and the cycle life characteristics decreased, and post-cycle resistance increased considerably. Since there are many coarse particles and a large amount of fine powder, the reaction occurring in the electrode is non-uniform, resulting in a decrease in rate characteristics. Furthermore, since the coarse particles break due to the change in lattice volume, an electron conduction network in the electrode breaks. Also, since the side reaction with the electrolyte also increases due to the presence of fine particles, the resistance increases considerably.

In Comparative Example 12, firing was performed continuously at a high temperature both at the time of generating the $Nb_2TiO_7$ phase as a main phase and at the time of generating the $Nb_{10}Ti_2O_{29}$ phase as a subphase; therefore, niobium-titanium composite oxide particles having high hardness were already generated before the K source and the P source were added. As such, when the heat treatment is performed after mixing the main phase and the subphase and further adding potassium and phosphorus at predetermined concentrations, high-strength particles that are difficult to crush even with a ball mill are generated. Therefore, the rate characteristics are significantly low, and the high-strength particles gradually crack during a charge-and-discharge cycle, resulting in an increase in resistance and a decrease in capacity.

According to at least one embodiment and Example described above, an active material is provided. The active material includes an $Nb_2TiO_7$ phase and at least one Nb-rich phase selected from the group consisting of an $Nb_{10}Ti_2O_{29}$ phase, an $Nb_{14}TiO_{37}$ phase, and an $Nb_{24}TiO_{64}$ phase. The active material includes potassium and phosphorus, and the total concentration of potassium and phosphorus in the active material is in the range of 0.01% by mass to 5.00% by mass. The average crystallite diameter is in the range of 80 nm to 150 nm. D10 is 0.3 µm or greater, and D90 is 10 µm or less, in a particle size distribution chart for the active material obtained by a laser diffraction scattering method. The active material satisfies a peak intensity ratio represented by the following Formula (1).

$$0<I_B/I_A\leq0.25 \qquad (1)$$

In Formula (1), $I_A$ is a peak intensity of a maximum peak attributed to the $Nb_2TiO_7$ phase and appearing at 2θ of 26.0±0.1° in a wide-angle X-ray diffraction pattern under CuKα rays as an X-ray source; and $I_B$ is a peak intensity of a maximum peak attributed to the aforementioned at least one Nb-rich phase and appearing at 2θ of 24.9±0.2° in the diffraction pattern.

The above active material can realize a secondary battery capable of exhibiting excellent input-output characteristics and cycle life characteristics.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An active material comprising an $Nb_2TiO_7$ phase and at least one Nb-rich phase selected from the group consisting of an $Nb_{10}Ti_2O_{29}$ phase, an $Nb_{14}TiO_{37}$ phase, and an $Nb_{24}TiO_{64}$ phase,
   wherein the active material comprises potassium and phosphorus,
   a total concentration of the potassium and the phosphorus in the active material is in a range of 0.010% by mass to 5.00% by mass,
   D10 is in the range of 0.3 µm to 1.5 µm, and D90 is in the range of 5.0 µm to 10 µm, in a particle size distribution chart for the active material obtained by a laser diffraction scattering method,
   an average crystallite diameter is in a range of 80 nm to 150 nm, and
   the active material satisfies a peak intensity ratio represented by Formula (1):

$$0<I_B/I_A\leq0.25 \qquad (1)$$

wherein in the Formula (1), $I_A$ is a peak intensity of a maximum peak attributed to the $Nb_2TiO_7$ phase and appearing at 2θ of 26.0±0.1° in a wide-angle X-ray diffraction pattern under CuKα rays as an X-ray source; and $I_B$ is a peak intensity of a maximum peak attributed to the at least one Nb-rich phase and appearing at 2θ of 24.9±0.2° in the diffraction pattern.

2. The active material according to claim 1, wherein a ratio ($C_K/C_P$) of a concentration $C_K$ of the potassium in the active material to a concentration $C_p$ of the phosphorus in the active material is in a range of 2.0 to 50.0.

3. The active material according to claim 1, wherein the total concentration of the potassium and the phosphorus in the active material is in a range of 0.050% by mass to 2.50% by mass.

4. The active material according to claim 1, wherein the average crystallite diameter is 90 nm to 150 nm.

5. The active material according to claim 1, wherein a BET specific surface area is from 0.5 $m^2/g$ to 5 $m^2/g$.

6. The active material according to claim 1, wherein in the particle size distribution chart, D10 is in the range of 0.4 µm to 1.5 µm.

7. The active material according to claim 1, wherein in the particle size distribution chart, D90 is in the range of 5.0 µm to 9.0 µm.

8. The active material according to claim 1, wherein the peak intensity ratio $I_B/I_A$ is in a range of 0.005 to 0.20.

9. An electrode comprising the active material according to claim 1.

10. The electrode according to claim 9, wherein the electrode comprises an active material-containing layer comprising the active material.

11. A secondary battery comprising:
    a positive electrode;
    a negative electrode; and
    an electrolyte,
    wherein the negative electrode is the electrode according to claim 9.

12. A battery pack comprising the secondary battery according to claim 11.

13. The battery pack according to claim 12, further comprising:
    an external power distribution terminal; and
    a protective circuit.

14. The battery pack according to claim 12, comprising a plurality of the secondary battery, wherein the secondary batteries are electrically connected in series, in parallel, or in a combination of in series and in parallel.

15. A vehicle comprising the battery pack according to claim 12.

16. The vehicle according to claim 15, comprising a mechanism configured to convert kinetic energy of the vehicle to regenerative energy.

17. The active material according to claim 1, wherein the active material has a composition represented by $Li_xNb_2TiO_7$ ($0 \leq x \leq 5$), $Li_xTi_{1-y}M1_yNb_{2-z}M2_zO_{7+\delta}$ where M1 is at least one selected from the group consisting of Zr, Si, and Sn, M2 is at least one selected from the group consisting of V, Ta, and Bi, and $0 \leq x \leq 5$, $0 \leq y \leq 1$, $0 \leq z \leq 2$, $-0.3 \leq \delta \leq 0.3$, or $Ti_{1-y}M3_{y+z}Nb_{2-z}O_{7-\delta}$ where M3 is at least one selected from Mg, Fe, Ni, Co, AV, Ta, and Mo, and $0 \leq y < 1$, $0 \leq z \leq 2$, and $-0.3 \leq \delta \leq 0.3$.

18. The active material according to claim 1, which comprises at least one additive element selected from the group consisting of Si, Fe, Ta, Na, Y, Al, and Sn.

19. The active material according to claim 18, wherein the at least one additive element is contained in the $Nb_2TiO_7$ phase, or the at least one Nb-rich phase, or both of the $Nb_2TiO_7$ phase and the at least one Nb-rich phase.

* * * * *